(12) United States Patent
Baechtle et al.

(10) Patent No.: US 9,185,917 B2
(45) Date of Patent: Nov. 17, 2015

(54) BRAKE RING

(71) Applicant: ALBERT HANDTMANN MASCHINENFABRIK GMBH & CO. KG, Biberach (DE)

(72) Inventors: Manfred Baechtle, Schemmerhofen (DE); Juergen Flach, Obermarchtal (DE); Michael Hammerer, Laupheim (DE); Wolfgang Pfender, Weingarten (DE); Gerhard Schliesser, Wain (DE); Siegfried Reutter, Eberhardzell (DE); Juergen Rechsteiner, Eberhardzell (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 0 days.

(21) Appl. No.: 14/608,055

(22) Filed: Jan. 28, 2015

(65) Prior Publication Data

US 2015/0208675 A1 Jul. 30, 2015

(30) Foreign Application Priority Data

Jan. 28, 2014 (EP) ..................................... 14152814

(51) Int. Cl.
*A22C 11/00* (2006.01)
*A22C 11/02* (2006.01)

(52) U.S. Cl.
CPC .................................. *A22C 11/0263* (2013.01)

(58) Field of Classification Search
USPC .......... 452/30–32, 35–39, 46–48, 51; 53/567, 53/576, 459
See application file for complete search history.

(56) References Cited

U.S. PATENT DOCUMENTS

| 4,034,441 | A | * | 7/1977 | Kupcikevicius et al. | ....... | 452/38 |
| 4,335,488 | A | * | 6/1982 | Becker | .......................... | 452/33 |
| 5,346,425 | A | * | 9/1994 | Kuenzel et al. | ................. | 452/38 |
| 8,870,634 | B2 | * | 10/2014 | Niedecker | ....................... | 452/37 |

FOREIGN PATENT DOCUMENTS

| DE | 202005006495 U1 | 8/2006 |
| EP | 0171849 A1 | 2/1986 |
| EP | 2716160 A1 | 4/2014 |

OTHER PUBLICATIONS

European Patent Office, European Search Report of EP14152814, May 26, 2014, 2 pages.

* cited by examiner

*Primary Examiner* — Richard Price, Jr.
(74) *Attorney, Agent, or Firm* — Alleman Hall McCoy Russell & Tuttle LLP

(57) ABSTRACT

Various systems and methods are provided for the manufacture of sausages. In one example, a method for manufacturing sausages with a filling machine comprises ejecting a mass through a filling tube into a sausage casing ruffled on the filling tube, and exerting a brake force on the sausage casing via a sausage casing brake on a braking area of a brake ring pressing onto the sausage casing, wherein the braking area extends around a longitudinal axis of the filling tube such that the braking area presses onto a part, and not the entirety, of a circumference of the sausage casing in a plane perpendicular to the longitudinal axis, and wherein the brake force is distributed in a direction along the longitudinal axis.

23 Claims, 19 Drawing Sheets

FIG. 1

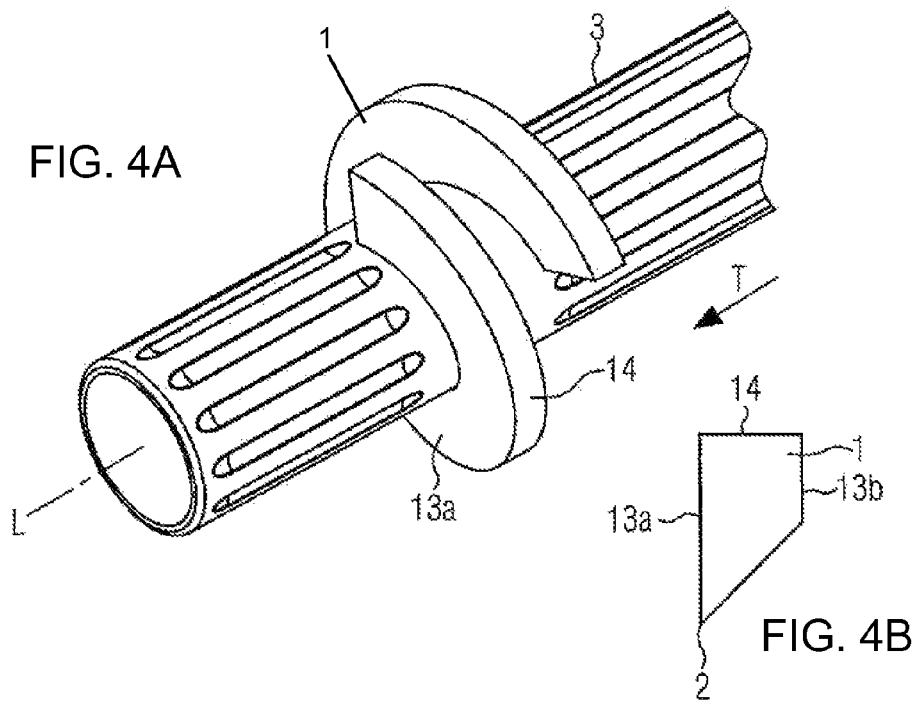
FIG. 4A
FIG. 4B
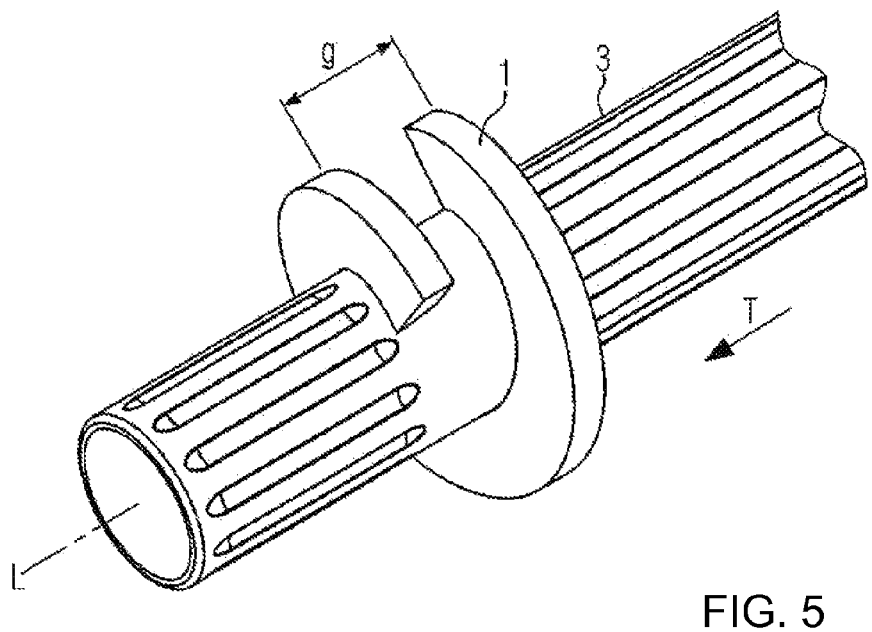
FIG. 5

Section D-D

Section A-A

Section A-A

BRAKE RING

CROSS REFERENCE TO RELATED APPLICATIONS

The present application claims priority to European Patent Application No. 14 152 814.1, entitled "BRAKE RING," filed on Jan. 28, 2014, the entire contents of which are hereby incorporated by reference for all purposes.

FIELD

The disclosure relates generally to the manufacture of sausages.

BACKGROUND AND SUMMARY

In some approaches to mechanical sausage production, a sausage casing is placed onto a filling tube at an end. A sausage casing brake may then be positioning at the filling tube end. Sausage casing brakes are employed to keep a sausage casing tensioned at the filling tube end when it is being filled with a mass such as sausage meat. To produce a desired sausage product, a sausage casing brake may be sensitively adjusted.

Several issues may arise in approaches to sausage production that utilize sausage casing brakes. For example, adjustment of the sausage casing brake force can be difficult because, if the brake force is too strong, regions where successive casings overlap may be pulled open. Moreover, if the brake force is excessively low, air may be stuffed into a sausage and/or the sausage may be insufficiently filled.

One approach that at least partially addresses the above issues includes a method for manufacturing sausages with a filling machine comprising ejecting a mass through a filling tube into a sausage casing ruffled on the filling tube, and exerting a brake force on the sausage casing via a sausage casing brake on a braking area of a brake ring pressing onto the sausage casing, wherein the braking area extends around a longitudinal axis of the filling tube such that the braking area presses onto a part, and not the entirety, of a circumference of the sausage casing in a plane perpendicular to the longitudinal axis, and wherein the brake force is distributed in a direction along the longitudinal axis.

In this way, overlapped points of two subsequent sausage casings may be drawn off without hindrance and without pulling apart the casing parts. Further, air inclusions and insufficiently filled products may be mitigated or prevented, as a sufficient braking effect can be realized.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Finally, the above explanation does not admit any of the information or problems were well known.

BRIEF DESCRIPTION OF THE DRAWINGS

FIG. 4A shows a further embodiment of a brake ring according to the present disclosure in a perspective representation.

FIG. 4B shows a cross-section through the brake ring shown in FIG. 4A.

FIG. 5 shows a further embodiment of a brake ring according to the present disclosure in a perspective representation.

DETAILED DESCRIPTION

Figure 1:
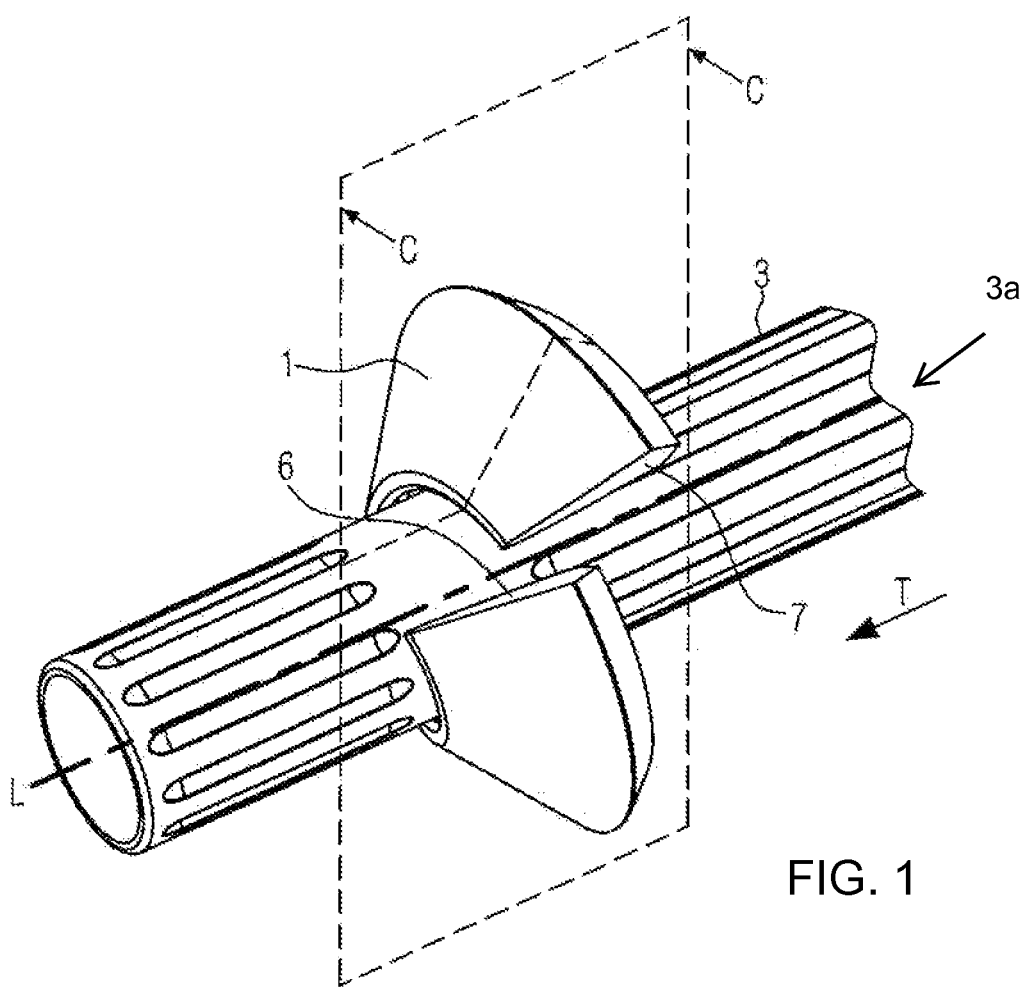
FIG. 1 shows a perspective representation of a brake ring according to an embodiment of the present disclosure.

In mechanical sausage production, the sausage casing is first placed onto the filling tube at the machine's outlet. Then, the sausage casing brake is positioned at the filling tube end. Sausage casing brakes are employed to keep the sausage casing tensioned at the filling point (e.g., at the filling tube end) when it is being filled with a mass (e.g. sausage meat). This is a prerequisite for the production e.g., of high-quality, tightly filled sausages, for example.

Apart from this, sausage casing brakes cause the yet unfilled sausage casing to rotate along on the filling tube while it is being wrung off. Wringing off is a method for separating a sausage length. When natural casings are processed, sausages are mainly separated by wringing them off. First, the pasty mass is filled into the casing via the filling tube, for example by means of a vacuum filler. For the casing to correspondingly fill up to its filling level, the take-off speed of the sausage casing from the filling tube is adjusted by the sausage casing brake. Said speed is normally somewhat slower than the ejection speed of the pasty mass. When the portion length or the portion weight is reached, the sausage length is wrung off. In the process, the filled length is retained against rotation on the side located in the direction of transport, and on the other side facing the filling tube, it is rotated until the casing is contracted and rotated corresponding to the set wring-off number.

As was already mentioned, the sausage skin (natural casing) is used among others in sausage production. There are different caliber grades (sizes between 16/18 mm and 26/28 mm being common, for example) and qualities (e.g., length of the individual pieces, filling stability) of the sausage skins. It is cut to size either from a plurality of individual pieces of typical lengths of up to 8 m, but in particular 3 to 4 m, or also in an overlapped configuration, for example. An overlapped sausage skin is a casing length of individual ends (e.g., individual casing pieces) which are each placed one upon the other over a length of, e.g., 30 cm, as can be in particular seen in FIG. 13. At the front region of the filling tube, seen in the direction of transport T, the end of a first sausage casing can be seen, while following this end, the beginning of the following sausage casing can be seen on the filling tube in the direction of transport T, the casing being disposed within the outer preceding sausage casing. The overlapped region is located between the ends. An overlapped sausage skin may then have a length of altogether, e.g., 20 to 30 m, to ensure more or less continuous production. By the overlapped sausage skins, the productive capacity may be clearly increased since the times for changing the casings are clearly reduced. However, issues may remain—for example, e.g., tightly filled portions may be desired as is often the case with the products "Frankfurter" or "Wiener".

To be able to produce tightly filled portions, the sausage casing or the casing may be relatively strongly slowed down, so that the flowing out pasty mass may correspondingly fill the casing up to the filling limit. A brake lip of the brake ring of the sausage casing brake will then press the casing onto the filling tube with a higher force. The beginning of the casing of an overlapped point may then, however, possibly get caught at the filling tube due to the pressure of the brake lip, so that the overlap may open, halting the production process. During the wring-off procedure, e.g., during the rotation of the filling tube, issues may arise, too.

Figure 3:
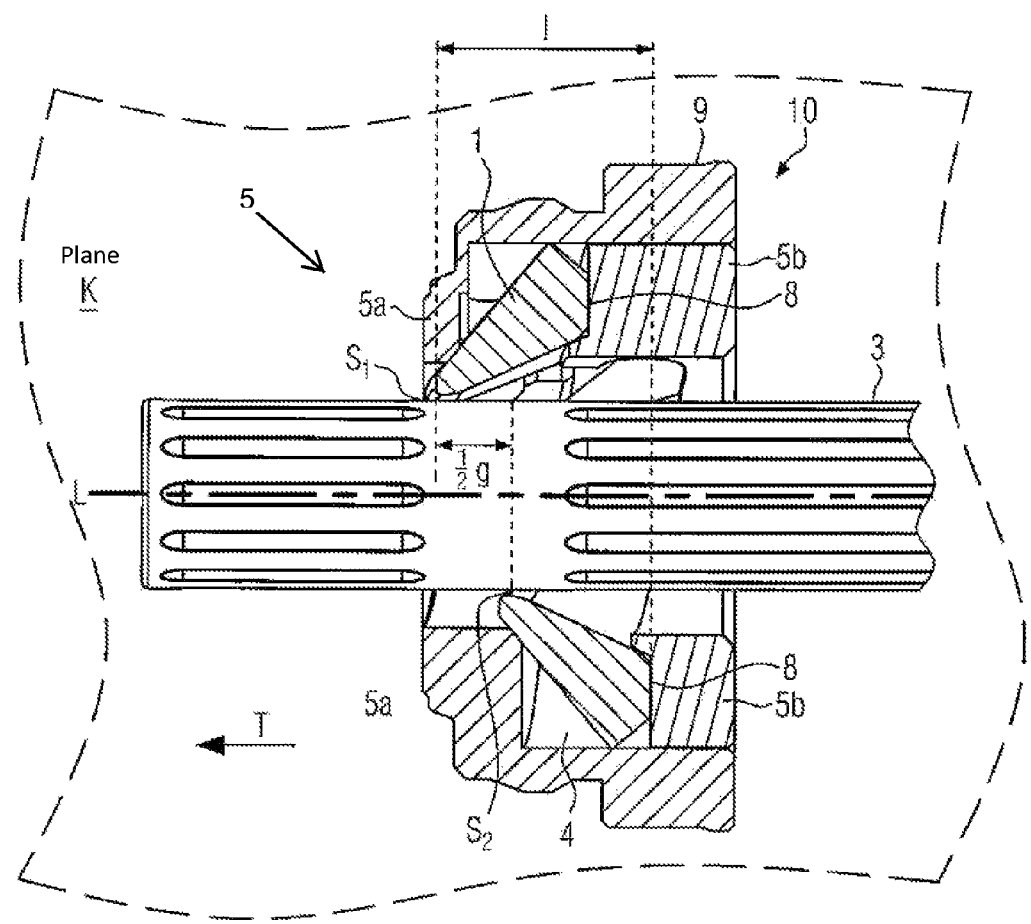
FIG. 3 shows a longitudinal section through a sausage casing brake according to an embodiment of the present disclosure with a brake ring as it is represented in FIG. 1.

Well-known rotating sausage casing brakes comprise a closed brake ring in different geometrical designs. Here, the brake lip of the brake ring is often disposed vertically or diagonally with respect to the longitudinal axis of the filling tube, as can also be taken from FIG. 13. The adjustment of the brake force is either effected in a fixed manner by a given diameter which is smaller than the filling tube diameter, or by pressing the brake ring or the brake lip against the filling tube with the aid of corresponding adjustment means 5a, b that may be adjusted with respect to each other, as can be seen in FIG. 3. The sausage casing brake may be configured to exert a brake force on a sausage casing on a braking area of the brake ring.

The hardness or the elasticity of the material used for the brake further influences the brake force. Apart from the already mentioned functions, the sausage casing brake may also unruffle the ruffled casing to ensure that the casing is radially taken along during the wring-off procedure. The speeds of the filling tube and of the driven sausage casing brake are either identical, or the filling tube is rotating while the sausage casing brake is stationary.

To be able to produce the desired product in the natural casing, the sausage casing brake may be correspondingly sensitively adjusted. Mainly in the processing of overlapped sausage skins, the former system may quickly reach its limits. The adjustment of the brake force may be difficult for two reasons: (1) if the brake force is too strong, the overlapped points are pulled open, and (2) if the brake effect is too low, air inclusions and not sufficiently filled products are produced.

Starting from this situation, the object underlying the present disclosure is to provide a brake ring, a sausage casing brake, a filling machine and a corresponding method which also permit filling overlapped sausage skins in a simple and reliable manner.

In one implementation of the present disclosure, sausages are manufactured with a filling machine, where pasty mass is ejected through a filling tube into a sausage casing ruffled on the filling tube and a brake force is exerted on the sausage casing by means of the sausage casing brake by a braking area of a brake ring pressing onto the sausage casing. The braking area extends around the longitudinal axis of the filling tube such that in a plane perpendicular to the longitudinal axis of the filling tube, the braking area of the brake ring presses onto a part (e.g., not the entirety of) of the circumference of the sausage casing and the brake force the braking area exerts on the surface of the sausage casing is distributed in a direction along the longitudinal axis of the filling tube L (FIG. 1). The longitudinal axis of the filling tube corresponds to the central longitudinal axis of the brake ring or the sausage casing brake which extends in the middle of the recess in which the filling tube comes to lie. The longitudinal axis of the filling tube is also to be understood as the extension of the axis beyond the filling tube. The fact that the brake force the braking area exerts on the surface of the sausage casing is distributed in a direction along the filling tube axis means that the force acts at different positions in the direction of the longitudinal axis of the filling tube L, and also that at least in sections, in planes E (FIG. 2B) perpendicular to the longitudinal axis of the filling tube at different positions in the direction of the longitudinal axis of the filling tube L, the brake force acts at different circumferential areas of the sausage casing, where the circumferential areas may overlap, but the brake force may also act at totally different angular regions of the circumference.

Figure 2A:
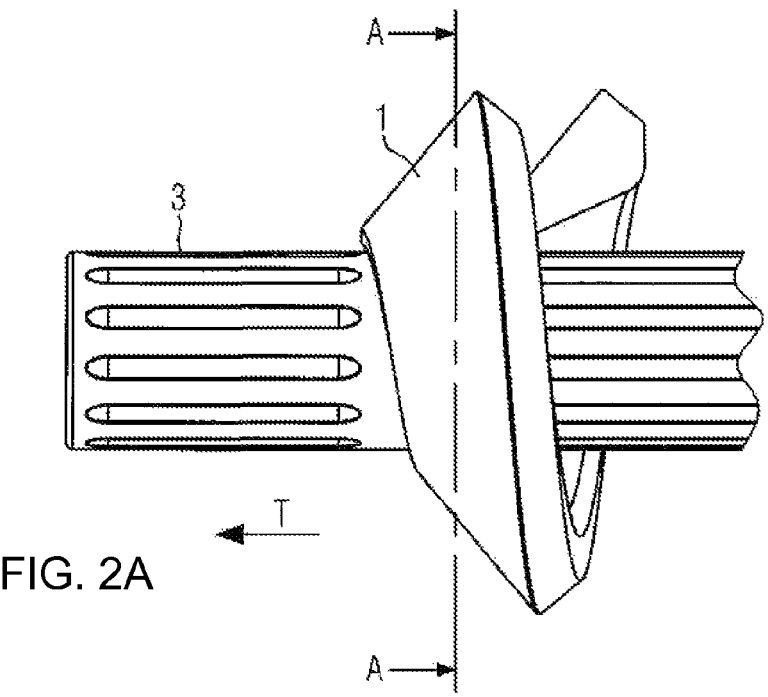
FIG. 2A shows a side view of the brake ring shown in FIG. 1.
Figure 2B:
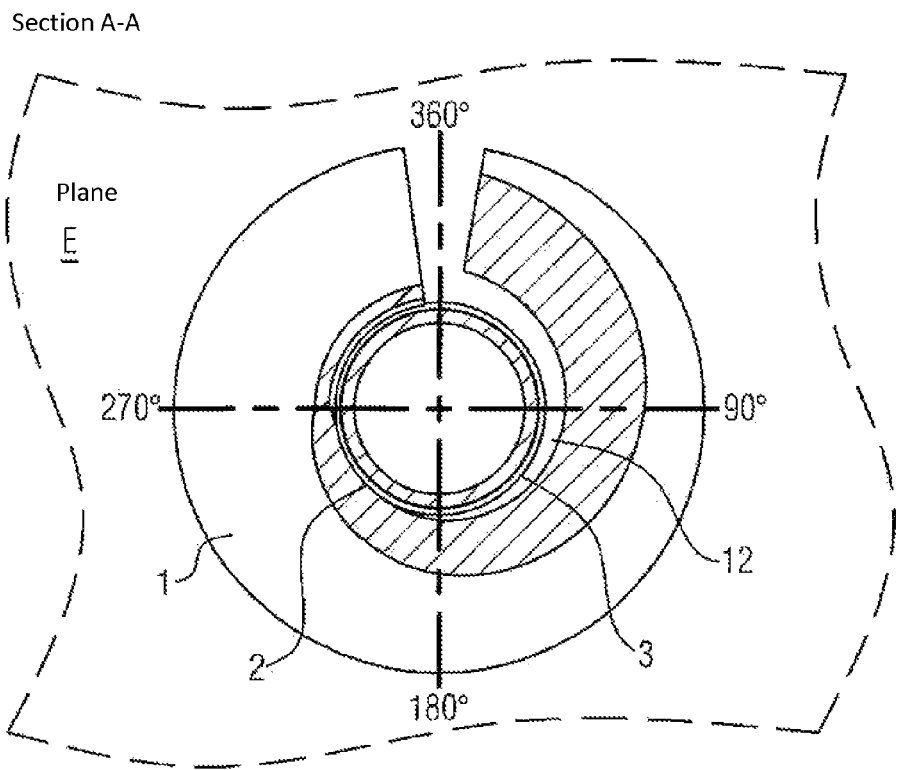
FIG. 2B shows a section through FIG. 2A along line A-A.

In some examples, braking area may be defined as the area of the brake ring which comes into contact with the sausage casing for holding or braking the sausage casing and which presses, for example, onto the filling tube or a surface surrounding a brake ring, e.g., a sleeve. A brake lip may be provided for this. Brake lip may be defined as a section of the brake ring e.g., tapering towards the braking area in a cross-section. According to the present disclosure, the braking area may not act in a plane, for example around the filling tube, as compared to other approaches. The braking area now also extends in the direction of the longitudinal axis of the filling tube. In contrast, the brake force the braking area exerts on the surface of the sausage casing is distributed in a direction along the axis of the filling tube L. A part of the circumference of the sausage casing is, for example, defined as an area of <180° of the circumference in the plane E (FIG. 2B). This corresponding condition applies to all cutting planes E over the total length of the brake ring.

In the respective "free region" in which the braking area does not lie against the sausage casing (or the filling tube located underneath), the overlapped point of two casing pieces may be, for example, further drawn off without hindrance. Since the braking area extends in a direction along the longitudinal axis of the filling tube, the force will be distributed in the direction of the longitudinal axis of the filling tube, while the total brake force onto the sausage casing may be adjusted by the braking area depending on the size of the overlap of the circumference of the sausage casing (or the filling tube located underneath). Even if the brake force is greater, the disadvantages mentioned above will not arise. Compared to the conventional brake rings that only press in one plane onto the complete circumference of the sausage casing, an increased production result may be achieved with the same brake force.

Altogether, the method according to the disclosure may permit desired processing of natural casings, in particular of overlapped sausage skins, resulting in a reduction of rework and a reduction of rejects due to fewer production stops. Simultaneously, more tightly filled products with a more consistent product quality may be achieved. A higher, more effective performance and correspondingly a more reliable process may result. Moreover, the casing or the sausage casing may be desirably unruffled and the number of burst casings reduced.

The sausage casing brake may be rotated for producing a wring-off point, while the speed may differ from or be equal to the speed of the filling tube, or may be variable. If the speed differs, different friction conditions arise, whereby the overlapped sausage casing region may pass the sausage casing brake in a more desired manner.

For carrying out the method, the brake ring is designed such that its braking area may extend around the filling tube such that in a plane E perpendicular to the longitudinal axis of the filling tube, the braking area lies against a part, and not the entirety, of the circumference of the filling tube. This applies to all cutting planes E over the total length of the brake ring. With a filling tube having grooves arranged in the surface facing the brake ring in the longitudinal direction, the brake ring is designed such that the braking area lies against a part, and not the entirety, of the virtual envelope of the filling tube surface in the plane E. This may apply to one or more of the embodiments disclosed herein, and in some examples to all of the embodiments disclosed herein. The brake ring may have a non-closed but open design, so it has a beginning and an end, the exposed start face of the brake ring being disposed in the direction of transport behind the corresponding end face. The direction of transport corresponds to the direction of ejection out of the filling tube. Thus, an open brake ring may be easily wound at least around a partial circumference around the surface of the filling tube corresponding to the present disclosure. A corresponding brake ring may be easily produced. However, it is also possible to provide a connection web between the start and end faces.

Hence, in accordance with the disclosure, the brake ring or the braking area of the brake ring may extend in a direction along the longitudinal axis of the filling tube at least around a part of the circumference of the filling tube, so that there is a plane K (FIG. 3) which contains the longitudinal axis of the filling tube L and against which, on opposite sides of the filling tube, the braking area lies on opposite sides at points staggered with respect to each other in the longitudinal direction of the filling tube. The term winding is to be understood as a winding with a pitch in this application.

The brake ring does not have to extend around the complete circumference, e.g., an area of 360°, around the filling tube, it is rather sufficient for it to already cover a partial region, depending on the application. In some examples, the brake ring may advantageously completely cover a circumferential area of 300 to 720°, 360° corresponding to a complete winding around the complete circumference. According to one embodiment, the brake ring has a spiral shape in the sense of a helix or a cylindrical spiral and spirally winds around the filling tube. The spiral does not have to be an exactly mathematical spiral. It may be desired that the brake ring winds around the filling tube in a direction of the longitudinal axis of the filling tube L. A partial spiral (overlapped circumferential area <360°) is also possible. The pitch of the winding or spiral does not have to be constant.

The lead of the spiral or helix may be within a range of >0 mm to 30 mm, in particular 5 mm to 15 mm, for example. The lead is the stretch around which the spiral winds with a full rotation)(360° in a direction along the longitudinal axis of the filling tube L.

The brake ring may also have a multi-piece design, e.g., may not be formed from one piece but comprise several, in particular at least two, spiral sections disposed around the filling tube. For this, for example two spiral sections may be disposed oppositely, in particular with an overlap of the circumference of more or less than or equal to 180°, or 100° to 300°, for example. Such an arrangement is particularly space-saving.

In some examples, the brake ring may be made of an elastic material, in particular an elastomer, as one non-limiting example.

Here, it is not compulsory to especially press on the brake ring to adjust the brake force, for example via a tensioning device.

A sausage casing brake according to the present disclosure may comprise a brake ring. The sausage casing brake exerts a brake force on the sausage casing by a braking area of a brake ring pressing onto the sausage casing. The braking area extends around the longitudinal axis of the filling tube such that in a plane E perpendicular to the longitudinal axis of the filling tube, the braking area of the brake ring may press onto a part, and not the entirety, of the circumference of the sausage casing, and the brake force the braking area exerts on the surface of the sausage casing is distributed in a direction along the longitudinal axis of the filling tube L.

The sausage casing brake may be suited for carrying out the methods disclosed herein. The braking area may be, in contrast to other approaches, asymmetrical to the longitudinal axis of the filling tube L. According to one embodiment, the brake ring is arranged such that it may extend around the filling tube, such that the braking area may press onto the filling tube surface or the sausage casing sandwiched in-between.

The sausage casing brake may also comprise a brake ring retainer which is disposed asymmetrically with respect to the longitudinal axis of the filling tube, so that the brake ring according to the present disclosure may be retained. The brake ring retainer may also comprise a tensioning device which exerts a variable force on the brake ring, so that the brake force is adjustable and the tensioning device comprises two tensioning means between which the brake ring is arranged, the tensioning means being each designed non-symmetrically to the longitudinal axis of the filling tube. Since the brake ring now is no longer held in the sausage casing brake symmetrically with respect to the longitudinal axis of the filling tube, the tensioning device may also have a corresponding design.

The sausage casing brake may, however, also have such a design that the brake force is not adjustable via a tensioning means. In this case, the design of the sausage casing brake may be simplified because the brake ring then may be retained by a brake ring retainer against slipping in the longitudinal direction and against rotation, for example in a recess in which the brake ring is held or by a retention part which prevents the brake ring from moving in the direction of transport T (FIG. 1) and from being rotated. As a non-limiting example, the brake ring may overlap the filling tube by 300° to 720° when no tensioning means are provided.

According to another possible embodiment, the brake ring is closed but is disposed on the filling tube obliquely, the plane in which the braking area is located being inclined by >0° to 45° (e.g., between 10° and 45°) to a plane perpendicular to the longitudinal axis of the filling tube L, for example. Hereby, the overlapped points may desirably pass the brake ring in the direction of transport in a spatially offset manner due to the elliptical course of the braking area.

The sausage casing brake may comprise a drive via which the brake ring may be rotated in its retainer, in particular at a variable speed. If the sausage casing brake is driven, during the wring-off procedure, with the for example spiral-shaped brake ring at a speed differing from the speed of the filling tube, different friction conditions arise whereby the overlapped sausage casing area may desirably pass the casing brake.

According to another embodiment of the present disclosure, the brake ring is now not disposed around the filling tube but formed at the filling tube end, for example by injection, the braking area pressing against a surface disposed around the brake ring, in particular a sleeve, while the sausage casing runs between the surface and the brake ring formed at the filling tube and is slowed down. Just as in the brake ring described above, the brake ring here may also be formed of an elastic material, in particular elastomer. The brake ring may have an elevation that winds around the longitudinal axis of the filling tube, the braking area being disposed at the upper end of this elevation of the brake ring. However, it is also possible for the brake ring to have an indentation to be wound around the longitudinal axis of the filling tube.

As an alternative, it is possible for the surface surrounding the brake ring to comprise an elevation winding around the longitudinal axis of the filling tube, so that the brake ring presses against this elevation, so that the braking area, corresponding to the present disclosure, then presses in a plane E onto a part, and not the entirety, of the circumference of the sausage casing and the brake force may be distributed in the longitudinal axis of the filling tube L. As an alternative, the surrounding surface may also have a corresponding recess or groove winding around the longitudinal axis of the filling tube L. Advantageously, the sleeve has a course tapering in the direction of transport of the sausages.

The disclosure also relates to a filling machine for filling a sausage casing with pasty mass with a filling tube and with a sausage casing brake.

According to a particular embodiment of the present disclosure, the filling machine for filling a sausage casing is designed such that in the rotation of the filling tube with a drive, different friction conditions result during the wring-off procedure.

Here, the brake ring, for example, may be designed such that its braking area is wound around the axis of the filling tube L.

The brake ring may itself wind around the longitudinal axis of the filling tube.

As an alternative, the surface of the filling tube or the surface of the brake ring facing the filling tube may also comprise a corresponding elevation or indentation which winds around the longitudinal axis of the filling tube.

It is finally also possible for the surface of the brake ring or a surface disposed around the brake ring, in particular a sleeve, to comprise an elevation or indentation which winds around the longitudinal axis of the filling tube.

These embodiments may provide advantages in connection with a drive via which the brake ring may be rotated at variable speeds since here, as also described above, friction conditions result which promote the slipping through of the overlapped points. Via the length, width and pitch of the elevations or indentations or the brake ring, the brake force may be exactly adjusted.

In this embodiment the braking area may press onto a part, and not the entirety, of the circumference of the sausage casing in a plane E perpendicular to the longitudinal axis of the filling tube L. The elevations do not necessarily have to be continuous; they may also include interruptions. Here, too, the lead of the corresponding windings of the elevations or indentations or the brake ring are within a range of >0 millimeters to 30 millimeters, or within 5 millimeters to 15 millimeters, for example. The windings may be spiral-shaped, as was also described in connection with the preceding embodiments. The pitch does not have to be constant and the lead corresponds to the values described in connection with the brake ring.

According to a further embodiment, the brake ring may also be designed as a sleeve whose inner surface is embodied in the form of an elevation or indentation winding around the longitudinal axis of the filling tube.

According to another embodiment, seen in the plane E of FIG. 2B, at least one free section is formed through which a sausage casing may be passed without being slowed down, the at least one section extending in the plane E over at least 20° of the circumference of the filling tube, for example.

FIG. 1 shows, in a perspective representation, a first embodiment of a brake ring 1 according to the present disclosure. Reference numeral 3 designates a filling tube via which pasty mass is to be conveyed into a sausage casing 11 (FIG. 13) in a well-known manner, where the sausage casing is pulled over the filling tube 3 in operation. The filling tube 3 may be charged with pasty mass via a hopper 13 and a feed mechanism 17, both shown in FIG. 14, in portions or continuously as is generally known and will not be illustrated more in detail here.

In mechanical sausage production, the sausage casing 11 is first placed onto the filling tube 3 or over its free end 3a. Then, the sausage casing brake 10 (FIG. 3) is positioned on the filling tube 3 in a well-known manner. The sausage casing brake 10 may be positioned at different locations in the direction of transport T (FIG. 1) of the sausage casing.

Depending on the embodiment, the filling tube 3 may be, for example, mounted rotatably and be driven about its longitudinal axis L via a drive (not shown), at a variable speed. The brake ring 1 serves to press the sausage casing onto the filling tube 3 and to brake the sausage casing during filling, as described above. The brake ring 1 winds around the filling tube 3 and has an open, non-closed shape. The brake ring 1 therefore has an exposed start face 6 and an exposed end face 7, the start face 6 being disposed, in the direction of transport, behind the end face 7. In this embodiment, a section (cutting plane K shown in FIG. 3 contains the longitudinal axis L) through the brake ring 1, e.g., a section along line C-C, has a substantially conically expanding shape and here presses with its brake lip with the corresponding braking area 2 onto the filling tube 3 (see FIG. 2A or FIG. 3). The brake ring 1 furthermore has an external face 8 (FIG. 3) at its broader end where a tensioning means 5 (FIG. 3) may press onto the brake ring, as will be discussed below. The brake ring may be made of an elastic material, for example a material of the group of elastomers. The brake ring 1 is embodied such that the braking area 2, e.g., the brake lip, lies against a part, and not the entirety, of the circumference of the filling tube 3 in a plane E perpendicular to the longitudinal axis of the filling tube L, as can be seen in particular in FIGS. 1-3, in particular FIGS. 1 and 2B. FIG. 2A shows a section through the brake ring, the cutting plane containing the longitudinal axis L. A section along line A-A perpendicular to the longitudinal axis shows that the brake ring partially lies against the filling tube 3. As can be seen in FIG. 2B, the complete circumference of the filling tube may correspond to 360°. In the free region 12 shown in a section, for example an overlapped region of an overlapped sausage skin may be further drawn off without hindrance when the sausage casing is being filled. In other approaches, the brake ring enclosed the complete circumference of the filling tube.

In this embodiment, the brake ring 1 has a spiral shape, e.g., a helix shape. The lead g (FIG. 3) of the spiral, e.g., that stretch around which the spiral winds at a full rotation (e.g., 360°) in a direction of the longitudinal axis of the filling tube L, is within a range of >0 mm to 30 mm, or 10 mm, for example. In FIG. 3, ½ g is represented. The spiral does not lie against the complete circumference (e.g., no full rotation), so that the theoretical value which the partial spiral would have were it lying against the complete circumference of 360° (e.g., full rotation) is assumed as lead. On the basis of the lead, the corresponding pitch then also results for this partial spiral.

Here, the spiral may be designed such that the spiral winds, in a non-installed state, around the envelope of a cylinder whose diameter is ≤ the diameter of the filling tube 3. If, as is represented in FIG. 3, a tensioning means for adjusting the brake force is provided, the diameter may even be larger than the filling tube diameter. The spiral, however, does not have to be an exactly mathematical spiral having a constant pitch. Rather, as described above, the braking area 2 or the brake lip may partially lay against the circumference of the sausage casing in a plane E perpendicular to the longitudinal axis on the filling tube, so that e.g., as can be taken from FIG. 3, in a plane K corresponding to the image plane in FIG. 3 and containing the longitudinal axis of the filling tube L, the braking area 2 lies, on opposite sides of the filling tube, against points S1, S2 staggered with respect to each other in the longitudinal direction, e.g., in the direction of transport. With a filling tube having grooves arranged in the longitudinal direction in the surface facing the brake ring, the brake ring is designed such that the braking area lies against a part of the virtual envelope of the filling tube surface in the plane E. Thus, the brake force the braking area 2 exerts on the surface of the sausage casing 11 on the filling tube may be distributed in a direction along the longitudinal axis of the filling tube L. The degree to which the sausage casing is slowed down altogether then also may depend on how far the brake ring overlaps the circumferential area of the sausage casing or the filling tube if the brake ring or the braking area is projected into one plane. In the embodiment shown in FIGS. 1 to 3, the brake ring covers a circumferential area of <360°, e.g., it does not enclose the complete circumference, and tips of the brake lip may not lie on a line parallel to the longitudinal axis L but may be spaced apart. FIG. 3 depicts in greater detail the sausage casing brake according to the present disclosure in which the brake ring 1 shown in FIGS. 1 and 2 is inserted. FIG. 3 is a longitudinal section of the brake.

The brake ring 1 is directed with its brake lip diagonally inwards towards the filling tube 3 and received in a brake ring retainer 4 (FIG. 3) which holds the brake ring in the brake ring housing. Since the brake ring is not a ring symmetrical to the longitudinal axis of the filling tube L, the brake ring retainer 4 may correspondingly be asymmetrical to the longitudinal axis of the filling tube L to hold the brake ring. In some examples, a brake ring retainer may be a simple recess or groove into which the brake ring is fitted and retained. The brake force may then be adjusted by the choice of the material and the diameter of the cylinders around which the spiral brake ring winds, the diameter of the cylinder of the cylindrical spiral being <, or =, or > the diameter of the filling tube 3.

In this embodiment shown in FIG. 3, the brake ring retainer comprises a tensioning device 5 with two tensioning means 5a, 5b. The brake ring 1 comprises, at its broader end, the surface 8 against which the tensioning means 5b comes to lie. The section of the brake ring facing the filling tube 3 is supported at a section tensioning means 5a. The distance of the tensioning means 5a, b with respect to each other is adjustable, for example by the means 5a, 5b being arranged axially movably with respect to each other, or for example in cups that can be screwed into one another. Other mechanisms are possible without departing from the scope of this disclosure. Since the brake ring winds in a direction of the longitudinal axis of the filling tube L, the tensioning device 5 may have a corresponding design. The tensioning means 5a, 5b may thus not be rotationally symmetric to the longitudinal axis L—e.g., they may be non-symmetric or asymmetric with respect to the longitudinal axis. For example, the tensioning means 5b in FIG. 3 has a greater dimension in the direction of the longitudinal axis of the filling tube L in the upper region than in the lower region. The tensioning means 5b may be designed such that it acts at the corresponding surface 8, where the complete surface 8 of the brake ring onto which the tensioning means 5b presses is not lying in one plane; the same applies to the tensioning means 5a which correspondingly supports the brake ring 1. Said tensioning means 5a is neither symmetrical to the longitudinal axis L. The spiral may be either left-handed or right-handed.

The sausage casing brake 10 may also comprise a drive via which the brake ring may be rotated in its retainer 4 or the tensioning means 5a, b, in particular at a variable speed, with the brake ring housing 9 in a not represented bearing. If in the wring-off procedure, the sausage casing brake 10 is driven with the spiral brake ring at a speed differing from the speed of the filling tube 3, different friction conditions arise which promote the slipping through of the overlapped points.

FIG. 4A shows a further embodiment according to the present disclosure which may correspond to the embodiment shown in FIGS. 1 to 3. In FIG. 4A, the brake ring 1 also has a spiral design and winds around the filling tube 3, here, however, with the overlap of >360°, e.g., the brake ring winds around the surface of the filling tube 3 more than once. As a non-limiting example, the overlap may be 400°. The lead corresponds e.g., to the embodiment shown in FIGS. 1 to 3. The spiral may be again right-handed or left-handed. In contrast to the embodiment shown in FIGS. 1 to 3, here the brake force may not be adjusted via a corresponding tensioning device 5, so that the brake ring 1 may be fitted into and held in a simple recess, for example a groove. As shows the cross-section through the brake ring 1 in FIG. 4B, said brake ring may also have a brake lip such that the braking area 2, which comes into contact with the filling tube 3, is as small as possible. Here, the brake force is defined and fixed, as also described above, via the material and the diameter of the cylinder around which the spiral winds in a non-installed state. In the cross-section, the brake ring 1 here also has two opposite flat side walls 13a and 13b and a surface 14 facing outwards with respect to the center axis of the brake ring or the longitudinal axis of the filling tube L. Lacking tensioning means, the sausage casing brake of FIG. 4A may provide a simplified configuration relative to approaches in which tensioning means are employed.

The embodiment shown in FIG. 5 corresponds to the embodiment shown in FIG. 4A and FIG. 4B, except for the spiral being left-handed here.

Figure 6:
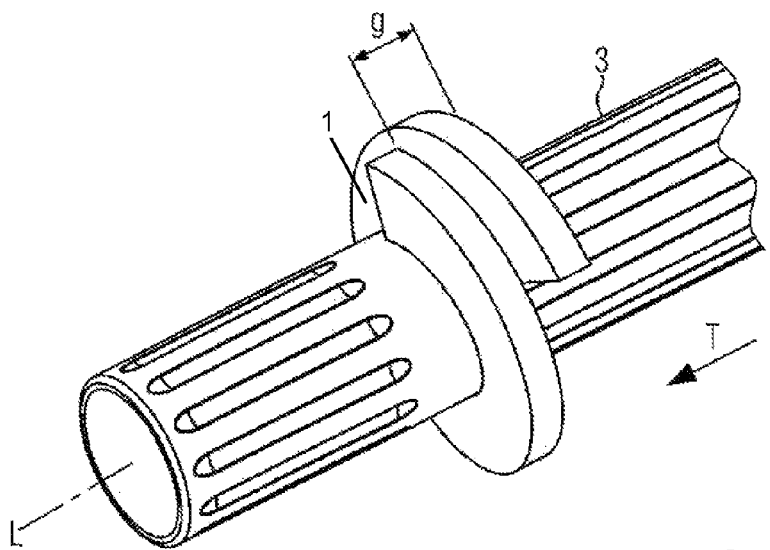
FIG. 6 shows a further embodiment of a brake ring according to the present disclosure in a perspective representation.

The embodiment shown in FIG. 6 corresponds to the embodiment shown in FIG. 4A of a right-handed spiral, here, however, the lead g is smaller, for example 6 mm.

Figure 7:
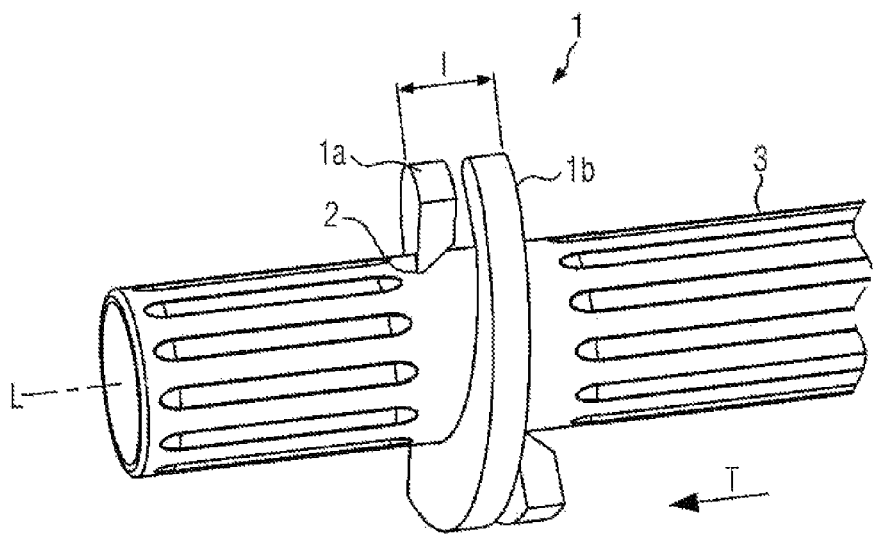
FIG. 7 shows a perspective representation of a further embodiment according to the present disclosure with two opposite brake ring parts.
Figure 8:
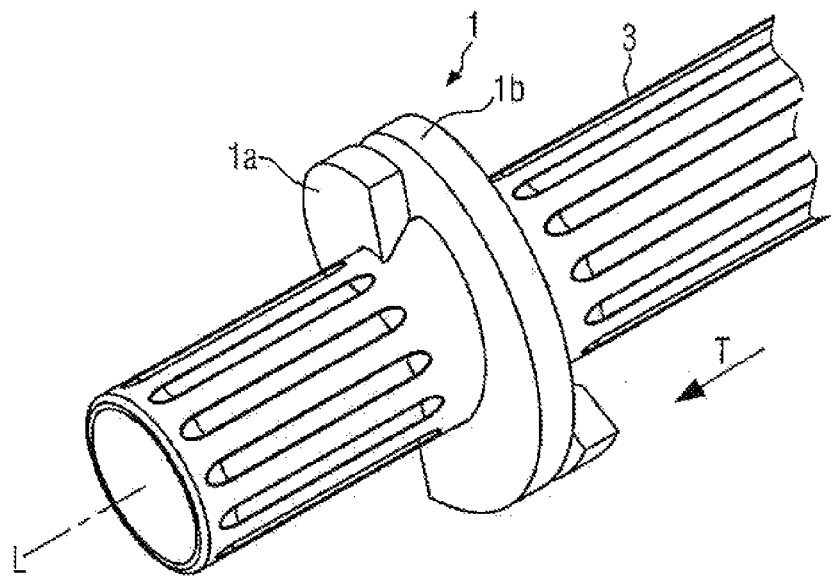
FIG. 8 shows the brake ring shown in FIG. 7 in another perspective.

FIGS. 7 and 8 show a further possible embodiment of the present disclosure. This embodiment, too, corresponds to the previous embodiments, but here, the brake ring 1 is not embodied in one piece as an open brake ring but in several pieces, e.g., two pieces. The sections 1a, b are disposed oppositely.

The respective spiral sections each cover a region, and not the entirety, of the circumference, e.g., than 180° but smaller than 360°. The spiral does not perform a full rotation, so that the theoretical value is assumed as lead which the partial spiral would have at a full rotation of 360°. On the basis of the lead, the corresponding pitch then also results for this partial spiral.

A corresponding sausage casing brake may be adapted to the multi-piece embodiment of the brake ring 1. As was described in connection with FIGS. 4 to 6, the brake ring may here, too, be formed such that the brake force is not adjusted separately, but may be adjusted, for example, via the diameter of the cylinder around which the spiral or partial spiral winds (in a non-installed state). The two spiral sections 1a, b intersect, as can be seen in FIGS. 7 and 8, e.g., an open side of the first spiral section 1a disposed in an upper region of the filling tube is located, in the direction of transport T, behind an open end of the spiral section 1b disposed on this side, while on the opposed side of the filling tube, a second free open end of the first spiral section 1a is located, in the direction of transport, in front of the second open end of the second spiral section 1b. This arrangement is particularly space-saving. This embodiment, however, may also be designed such that the brake force is adjustable by means of a tensioning device.

Figure 9:
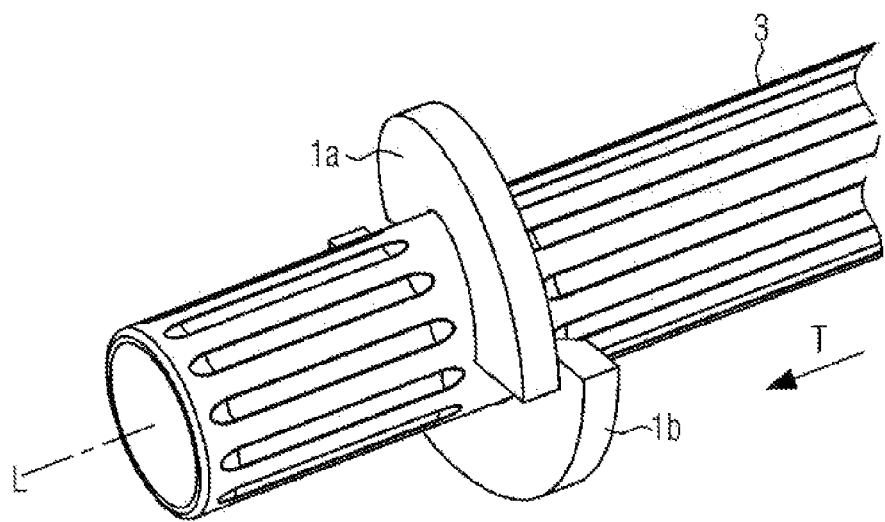
FIG. 9 shows a further embodiment according to the present disclosure in a perspective representation with two opposite brake ring parts.
Figure 10:
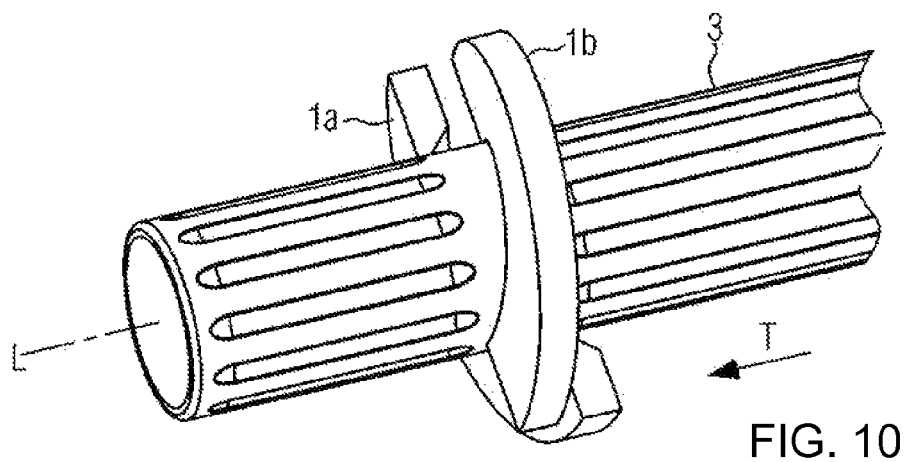
FIG. 10 shows the brake ring shown in FIG. 9 in another perspective.
Figure 11A:
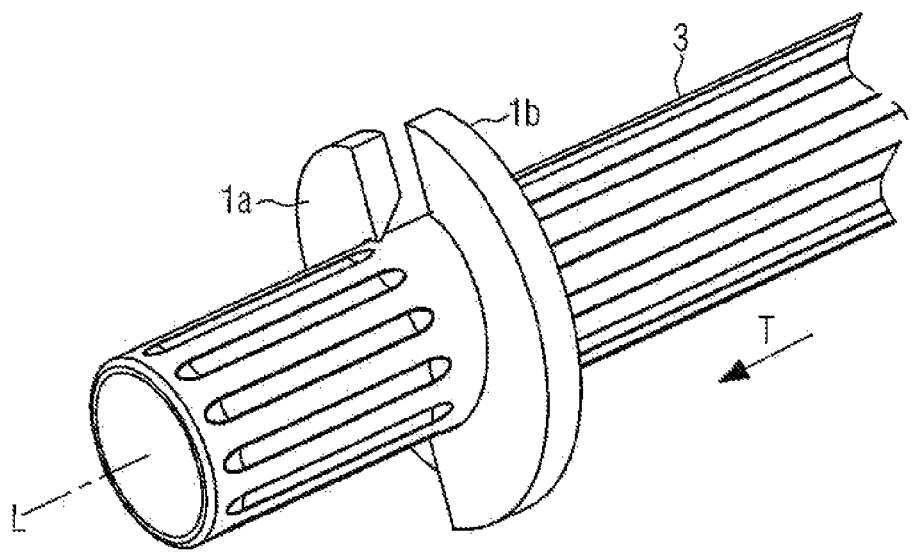
FIG. 11A shows the brake ring shown in FIGS. 9 and 10 in another perspective.
Figure 11B:
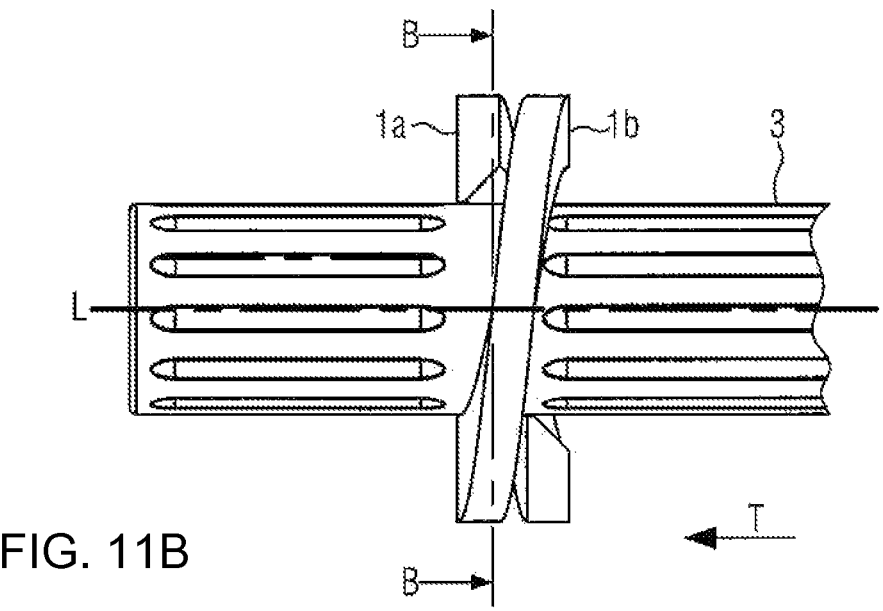
FIG. 11B shows a side view of the embodiment shown in FIGS. 9-11A.
Figure 11C:
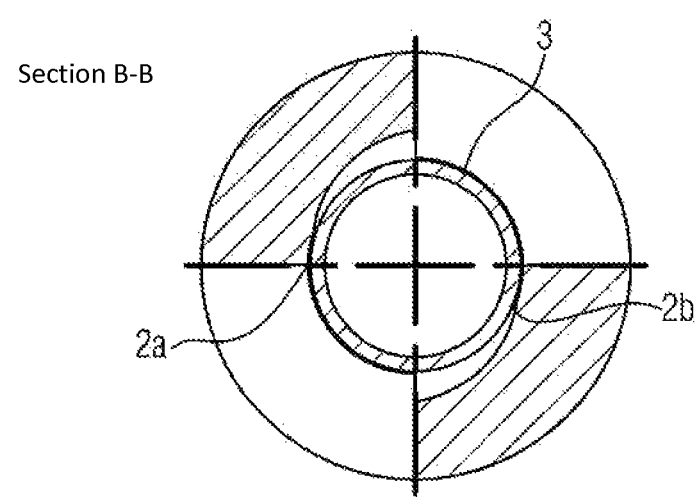
FIG. 11C shows a section along line B-B in FIG. 11B.

FIGS. 9 to 11 also show, in different perspectives, a brake ring 1 which is composed of several spiral parts 1a, b. As was also illustrated in connection with FIGS. 7 and 8, here the two spiral sections are diagonally opposed. The difference to the embodiment shown in FIGS. 7 and 8 is that the two spiral sections have an overlap of the surface of ≤180°, e.g., 180°. FIG. 11A is a side view of the two spiral sections 1a, b of the brake ring 1. As can be seen in FIG. 11A, the two sections 1a, b intersect, e.g., an open side of the first spiral section 1a disposed in an upper region of the filling tube is located, in the direction of transport, behind an open end of the spiral section 1b disposed on this side, while on the opposed side of the filling tube, a second free open end of the first spiral section 1a is located, in the direction of transport, in front of the second open end of the second spiral section 1b. FIG. 11C is a section along line B-B, e.g., it shows a plane E which is perpendicular to the longitudinal axis L. As becomes clear from FIG. 11C, the brake ring 1 here partially lies against the filling tube 3 (or in operation at the sausage casing sandwiched in-between), here at two points 2a, 2b.

The advantage of the multi-piece brake ring 1 with opposed sections is that the sausage casing may be supported from two sides, but without excessive force acting on the sausage casing in one plane.

Figure 12A:
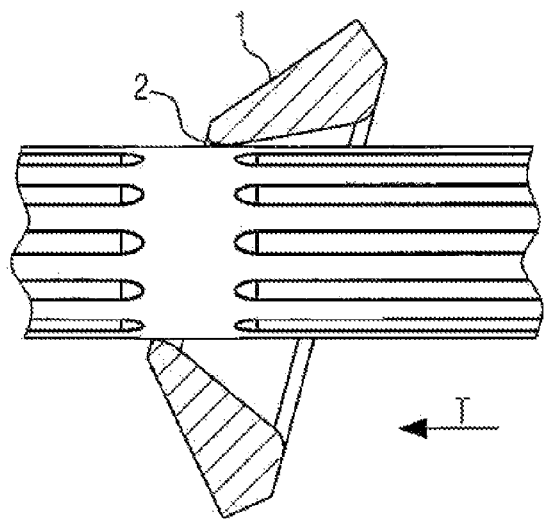
FIG. 12A shows a longitudinal section through a further embodiment of a brake ring according to the present disclosure.
Figure 12B:
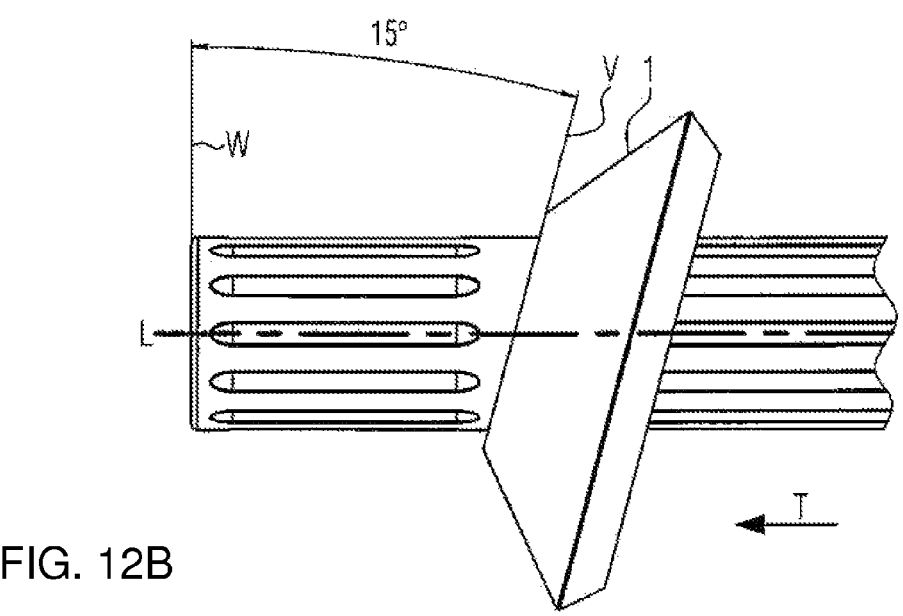
FIG. 12B shows a side view of the section shown in FIG. 12A.
Figure 12C:
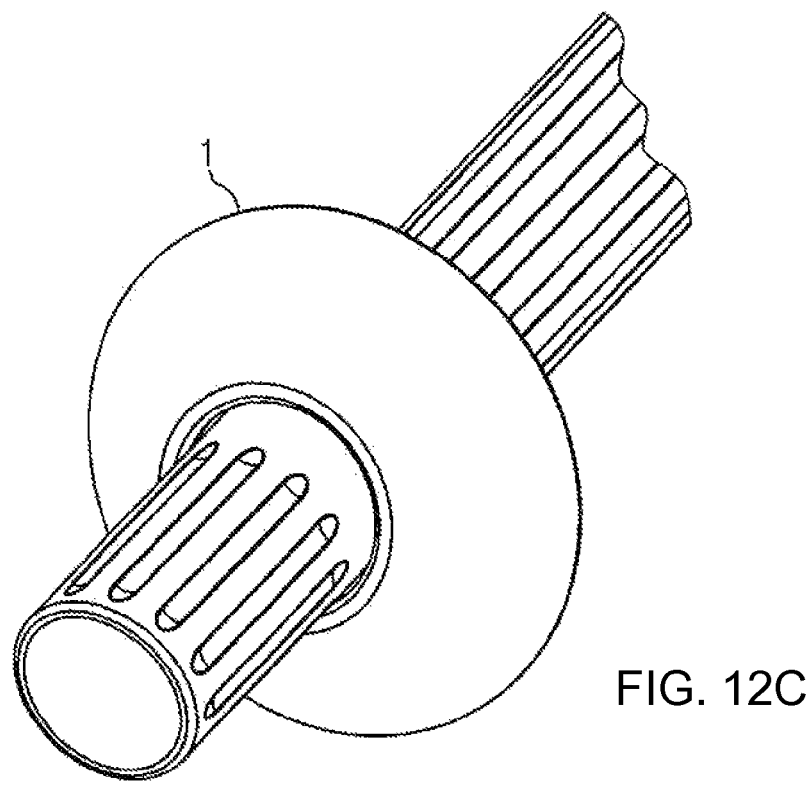
FIG. 12C shows a perspective representation of the brake ring shown in FIGS. 12A, 12B.

FIGS. 12A-D show a further embodiment according to the present disclosure. This embodiment is a closed brake ring, as can be in particular seen in FIG. 12D, which here has a diameter, just as in the embodiment shown in FIG. 1, which broadens in one direction, here against the direction of transport. As can be taken from FIG. 12D, the smallest diameter i of the closed brake ring at its rear side is larger than the filling tube diameter such that the brake ring 1 may be inclined on the filling tube, as can be in particular seen in FIGS. 12A and 12B. This means that the plane V (FIG. 12B) which is spanned by the annular braking area 2, is inclined with respect to a plane W (FIG. 12B) which extends perpendicularly to the axis of the filling tube L, e.g., by an angle of >0° to 30°, or particularly by 15°, or another suitable range. By the inclined arrangement, which is shown in FIGS. 12A, 12B and 12C, due to the elliptical contact of the braking area 2, different degrees of contact forces and friction conditions result, whereby the overlapped points may desirably pass the brake ring. Moreover, as in all other embodiments, the brake ring is designed such that it extends or winds around the filling tube such that, in a plane perpendicular to the longitudinal axis of the filling tube, the braking area lies against a part of the circumference of the filling tube. Thus, in the closed embodiment as well as in the open embodiment, a distribution of the brake force in the longitudinal direction, e.g., along the longitudinal axis of the filling tube L, results. It is also possible to provide several brake rings diagonally arranged one behind the other with the same orientation of the diagonal position or with opposed orientations of the diagonal position in the sausage casing brake. A sausage casing brake then has a corresponding brake ring retainer. In the embodiment shown in FIG. 12A-A, it is also possible to provide a brake ring retainer with a tensioning device that exerts additional pressure on the brake ring.

Figure 12D:
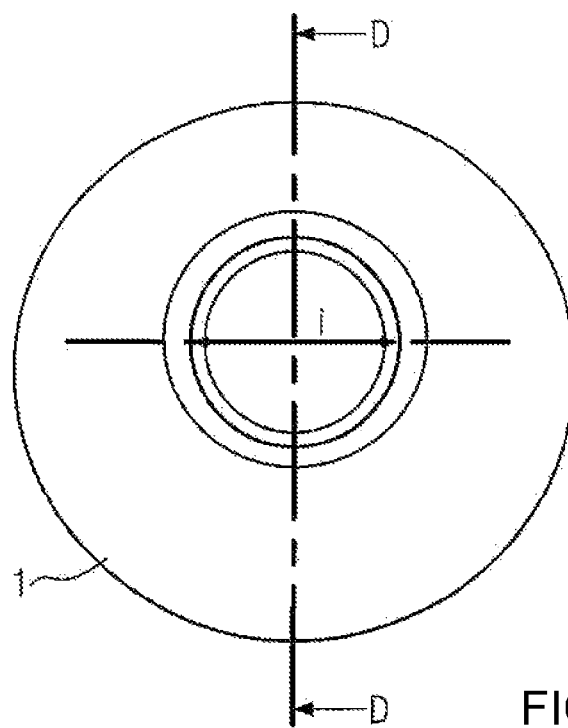
FIG. 12D shows a plan view onto the brake ring shown in FIGS. 12A, 12C.

While it is not represented, it is also possible according to the present disclosure to provide, for example, a brake ring 1 which is formed from several sections which, seen in the direction of transport T, are arranged one behind the other and spaced apart from one another around the longitudinal axis of the filling tube L. It is also possible to provide a brake ring which is arranged perpendicularly to the longitudinal axis L (for example, plane V would then be parallel to plane D, as is shown in FIG. 12D), where a region of the brake lip is "ground out", e.g., removed, so that the brake ring does not completely lie against the filling tube. As a non-limiting example, the recessed region may have a size of 100° to 260°.

Then, a second brake ring part may be arranged following a corresponding brake ring part where the brake lip also has been removed in a certain region, in particular ground out. The removed region of the second brake ring part may be located on a side opposed to the first removed part.

Figure 15A:
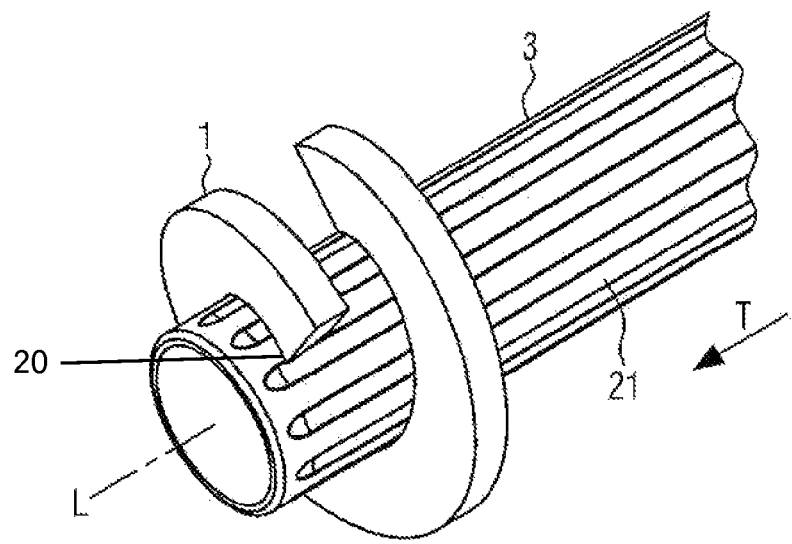
FIG. 15A shows a further embodiment according to the present disclosure in a perspective representation.
Figure 15B:
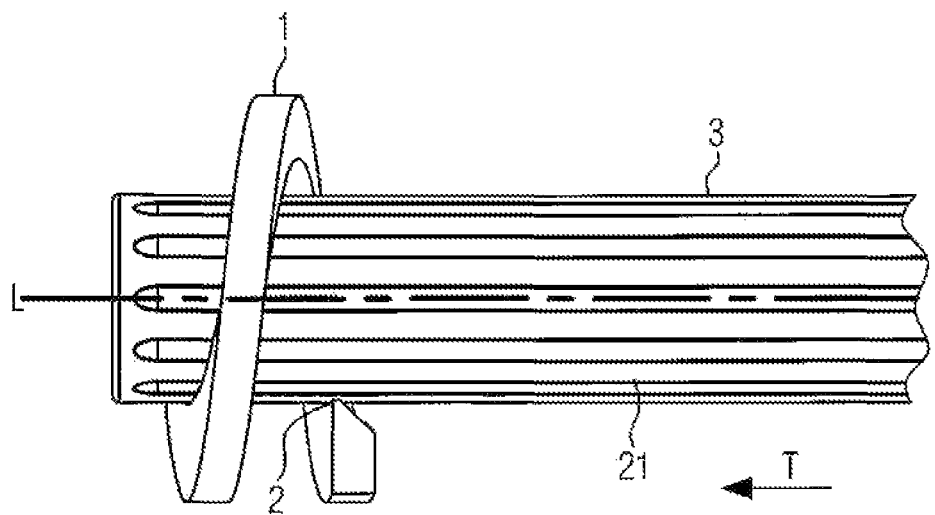
FIG. 15B shows the embodiment shown in FIG. 15A from a lateral view.

FIG. 15A and b show another possible embodiment of the present disclosure. According to this further embodiment, the filling tube 3 comprises longitudinal grooves 21 distributed across the circumference, the brake ring 1 at least partially resting on these longitudinal grooves 21. The brake ring may here be embodied as defined more in detail in the previous embodiments. Due to the longitudinal grooves 21 in the surface of the filling tube 3, the braking area 2 which acts on the filling tube 3 or the here non-depicted sandwiched sausage casing is additionally further reduced. Thus, the brake force around the circumference of the filling tube 3 may be further reduced.

As in the previous embodiments, the brake ring 1 is designed such that the braking area 2 may extend such that in a plane E perpendicular to the longitudinal axis of the filling tube, the braking area of the brake ring 1 pressing onto a part, and not the entirety, of the circumference of the sausage casing 11 or the filling tube 3.

Figure 16A:
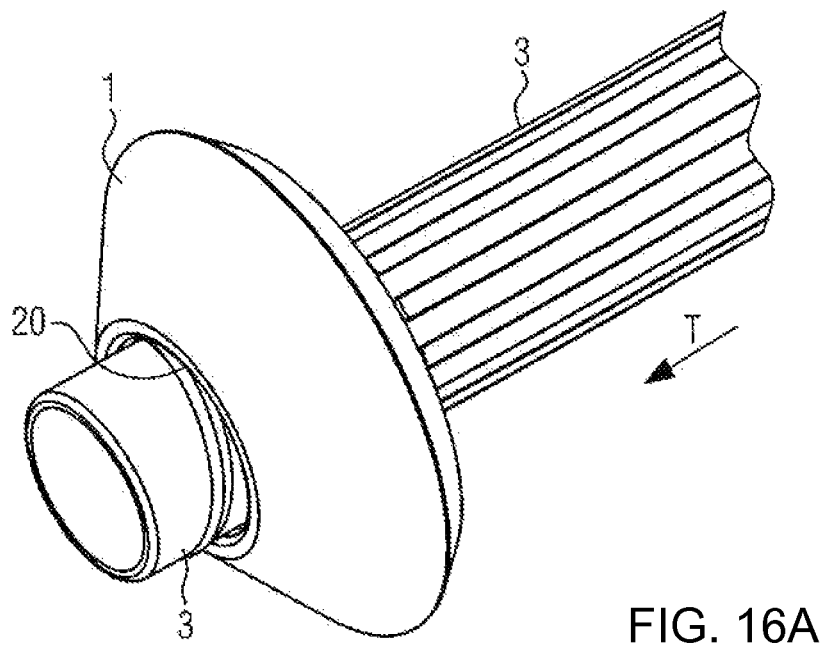
FIG. 16A shows a perspective representation of a further embodiment of the present disclosure.
Figure 16B:
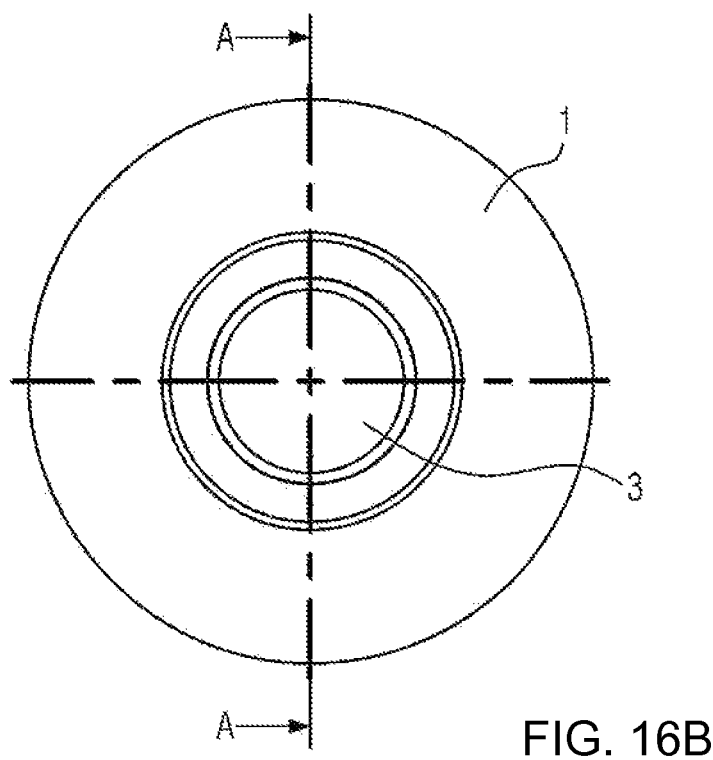
FIG. 16B shows the front view of the embodiment shown in FIG. 16A.
Figure 16C:
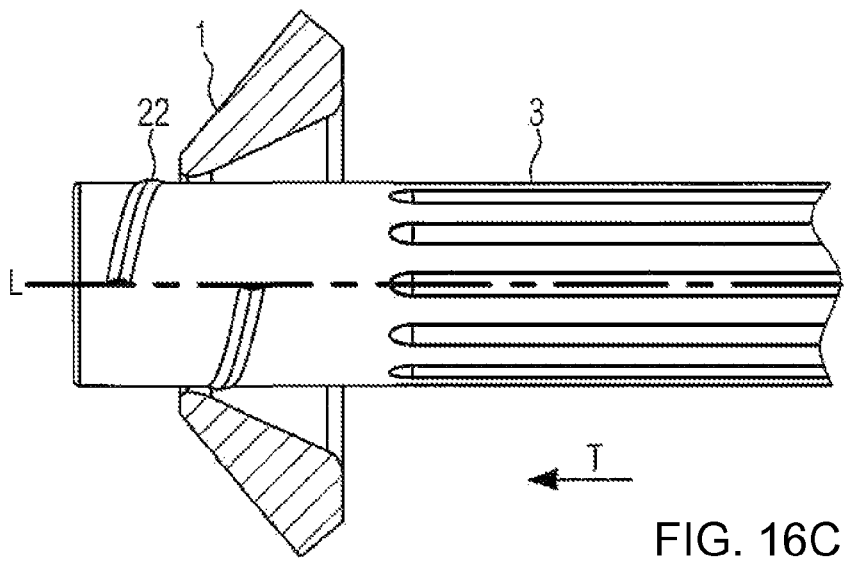
FIG. 16C shows a section along line A-A of FIG. 16B.
Figure 16D:
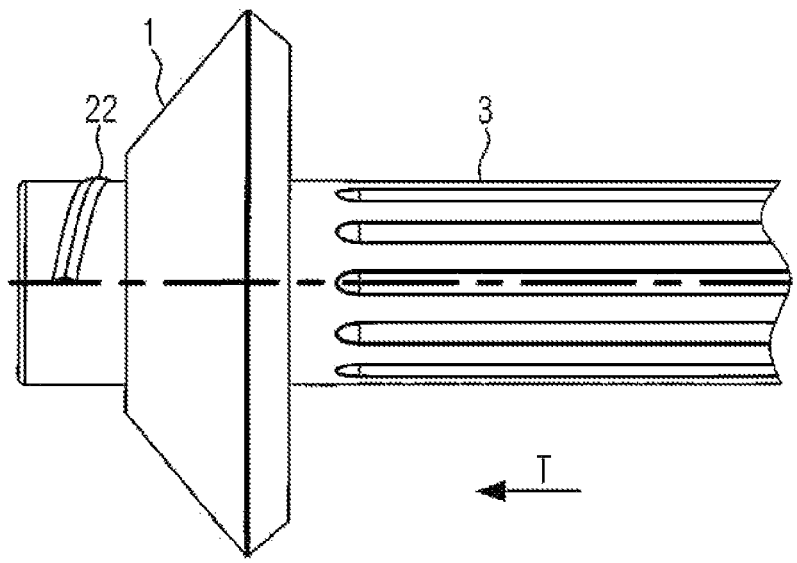
FIG. 16D shows a side view of the embodiment shown in FIG. 16A-C.
Figure 17A:
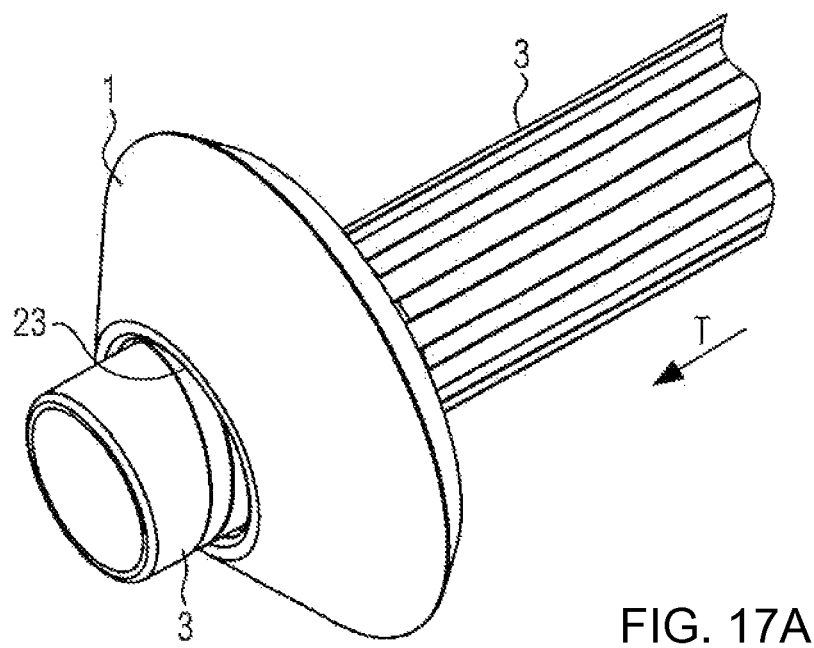
FIG. 17A shows a perspective representation of a further embodiment of the present disclosure.
Figure 17B:
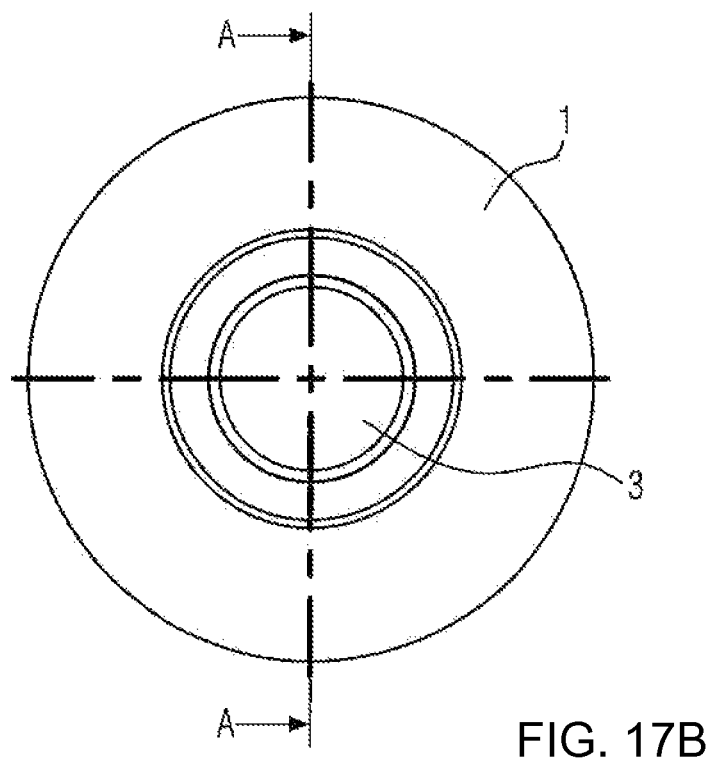
FIG. 17B shows the front view of the embodiment shown in FIG. 17A.
Figure 17C:
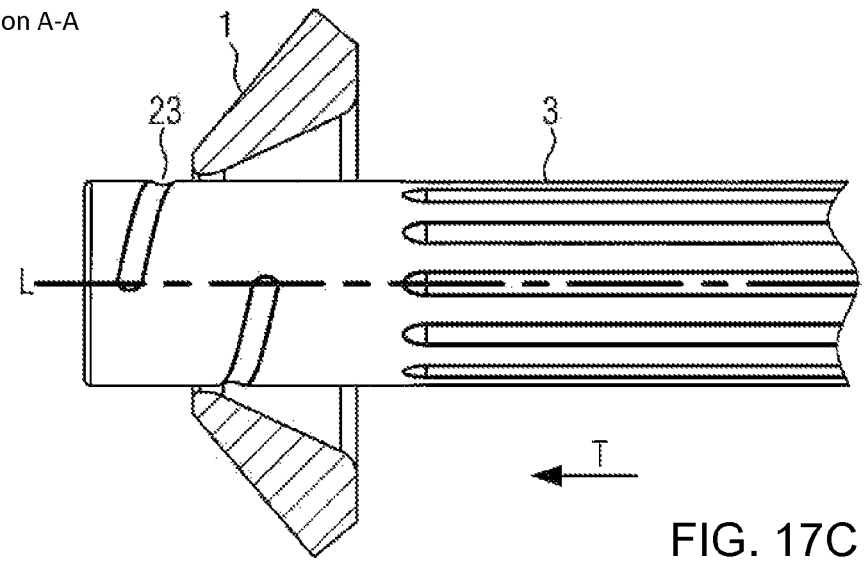
FIG. 17C shows a section along line A-A of FIG. 17B.
Figure 17D:
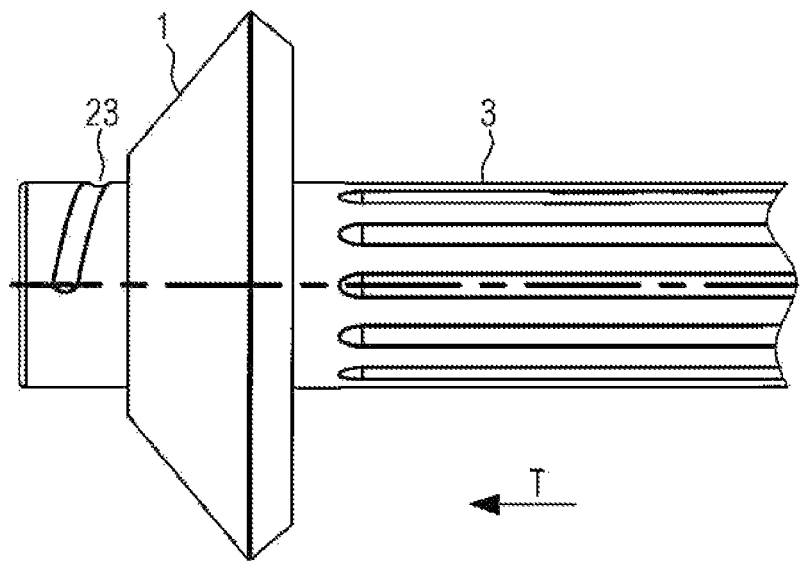
FIG. 17D shows a side view of the embodiment shown in FIG. 17A-C.

FIGS. 16A, B, C and D show a further embodiment where the filling tube 3 is designed such that the braking area does not lie against the circumference in a plane E. As can be seen in FIGS. 16A, C and D, this embodiment has a closed brake ring 1. Here, the brake ring 1 is designed, for example, as described in connection with FIGS. 12A-D, the inner diameter of the brake ring diminishing in the direction of transport, e.g., the inner surface of the brake ring tapers in the direction of transport. In contrast to the embodiment shown in FIG. 12, the brake ring 1 may be inclined, and it is also possible for the annular braking area 2 to span a plane V which extends perpendicularly to the longitudinal axis of the filling tube L. The brake ring 1 could, as an alternative, also be designed as a closed simple ring with a constant inner diameter, as will be illustrated below more in detail in connection with FIG. 18. Moreover, the corresponding brake rings 1 may not completely enclose the filling tube 3.

Here, it may be desired that the filling tube surface 3 has an elevation 22 at least in the area where the brake ring 1 is to be arranged, which elevation in particular winds around the longitudinal axis of the filling tube L, for example spirally or helically. Thus, the braking area 2 may press onto the sausage casing in the region where the brake ring 1 is opposite to the elevation 22, as can be taken in particular from FIG. 16A. Here, the same advantages result as described above.

The embodiment described in FIGS. 17A-D corresponds to the embodiment described in connection with FIGS. 16A, B, C, D where, however, instead of the elevation 22, a corresponding indentation 23 is formed in the filling tube surface. As with the elevation 22, the indentation 23 may wind around the longitudinal axis of the filling tube L. Here, the braking area 2 may not press onto the sausage casing or the filling tube in the region where the brake ring 1 and the indentation 23 are opposed. The braking area 2 may press onto the filling tube surface 3 or the sausage casing in regions where no indentation 23 is arranged. The extension of the elevation 22 or indentation 23 in the direction L may also be clearly larger than shown in the drawings.

Figure 18A:
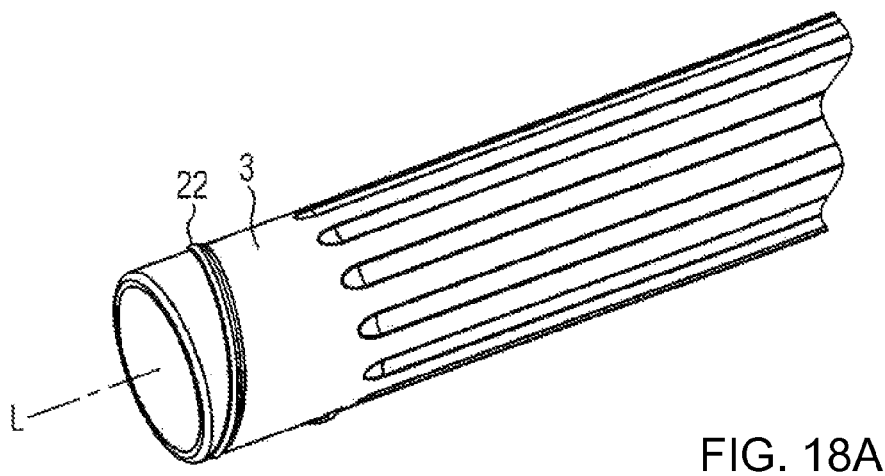
FIG. 18A shows a perspective representation of a further embodiment of the present disclosure.
Figure 18B:
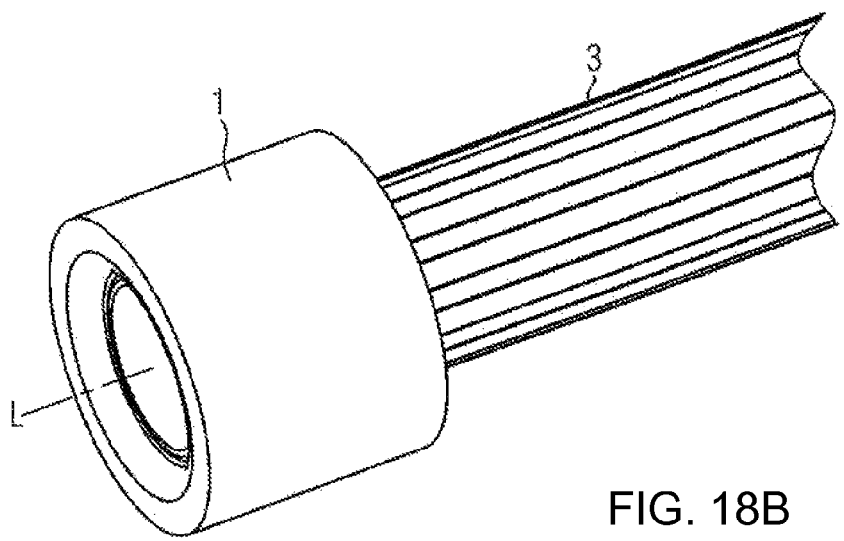
FIG. 18B shows the embodiment shown in FIG. 18A with a placed brake ring.
Figure 18C:
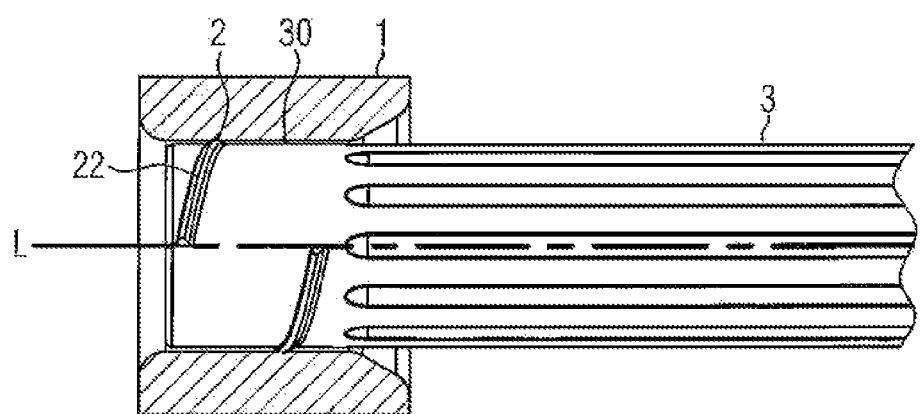
FIG. 18C shows a longitudinal section through the embodiment shown in FIG. 18B.

The embodiment shown in FIGS. 18A, B, C corresponds to the embodiment shown in FIG. 16, where an elevation 22 extends around the surface of the filling tube 3, in particular winds around it spirally or helically. The brake ring 1 here has, for example, a hollow-cylindrical section 30, where here, too, the braking area 2 winds around the filling tube 3. Instead of the elevation 22, a corresponding indentation 23 may also be formed on the filling tube surface, as described in connection with FIG. 17A-D. Though it is not represented, the hollow-cylindrical brake ring 1 may also be designed as a sleeve and have, on its inner side, a corresponding elevation which extends around the longitudinal axis of the filling tube L on the inner side of the brake ring 1, or have a corresponding indentation, such that here, too, the braking area 2 extends around the longitudinal axis of the filling tube such that the braking area of the brake ring lies against a part, and not the entirety, of the circumference of the sausage casing perpendicular to the longitudinal axis of the filling tube, and the brake force is distributed in a direction along the longitudinal axis of the filling tube. As also in connection with the brake ring 1 in the above described embodiments, it may be desirable for the braking area to wind around the longitudinal axis L such that it covers a circumferential area of 300° to 720°, for example. Here, too, a lead g may be, if the braking area winds spirally, within a first range of >0 to 30 mm, or within a second range of 5 to 15 mm, corresponding to the statements concerning the spiral brake ring, for example.

Figure 19A:
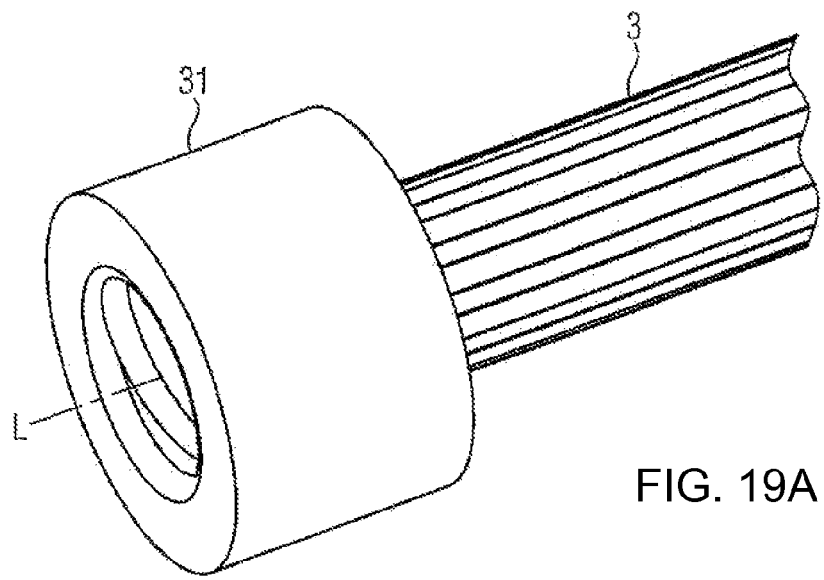
FIG. 19A shows a further embodiment according to the present disclosure with a brake ring formed at the filling tube in a perspective representation.
Figure 19B:
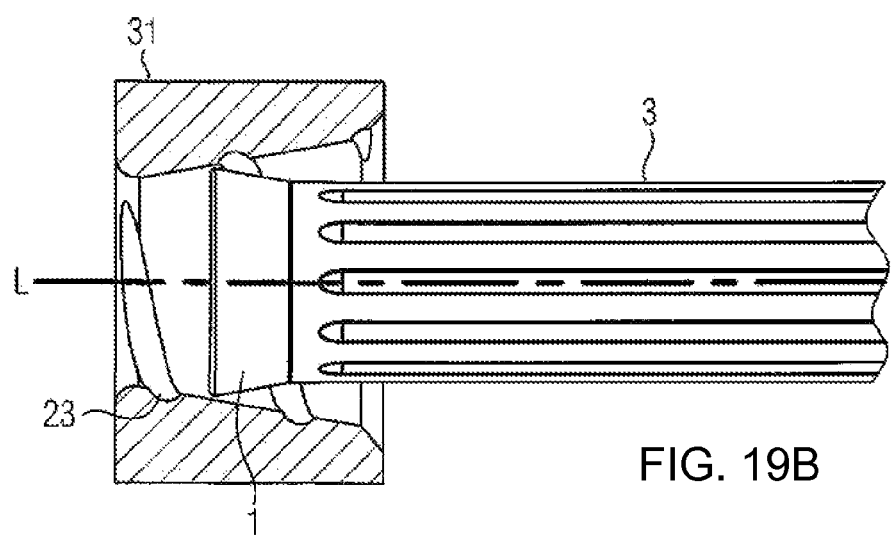
FIG. 19B shows a longitudinal section through the embodiment shown in FIG. 19A.
Figure 19C:
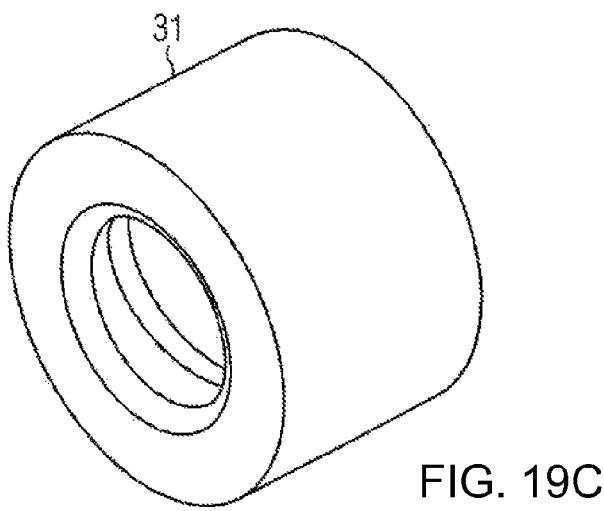
FIG. 19C shows a sleeve in a perspective representation.
Figure 20A:
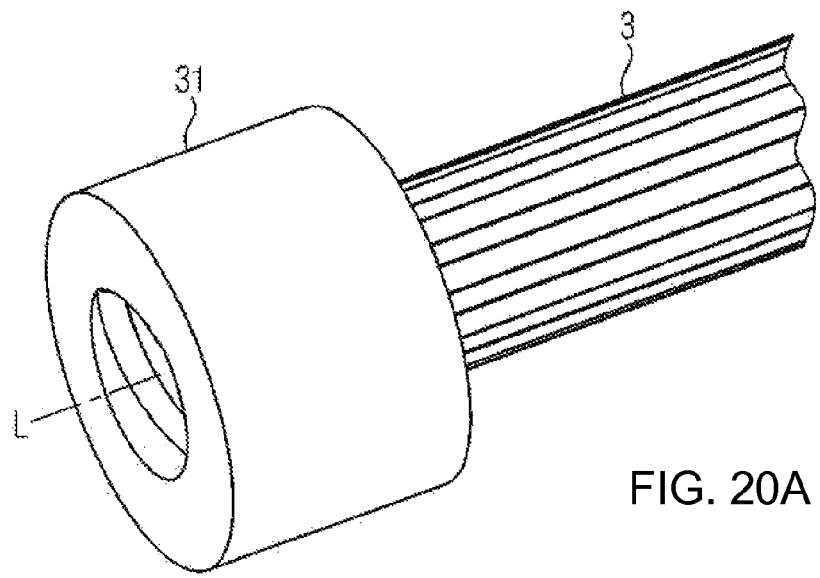
FIG. 20A shows a perspective representation of a further embodiment of the present disclosure where the brake ring is formed at the filling tube.
Figure 20B:
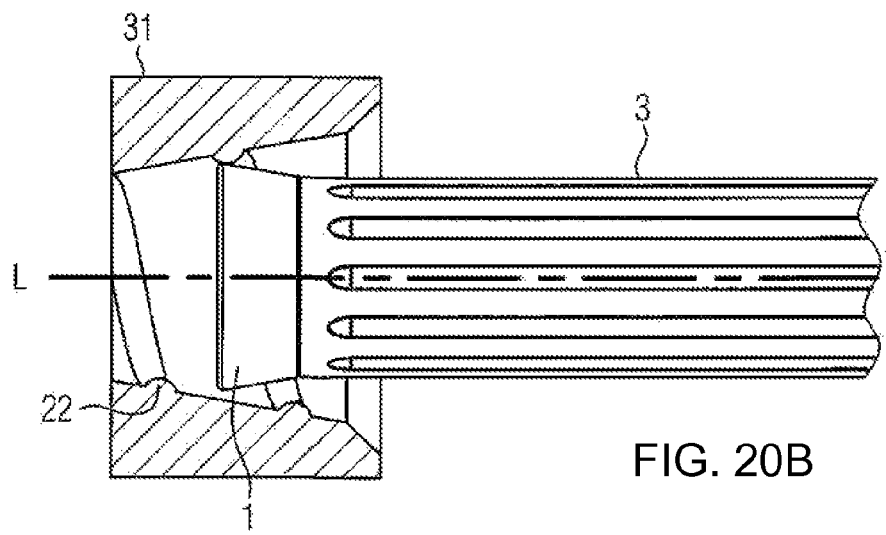
FIG. 20B shows the embodiment shown in FIG. 20A in a longitudinal section.
Figure 20C:
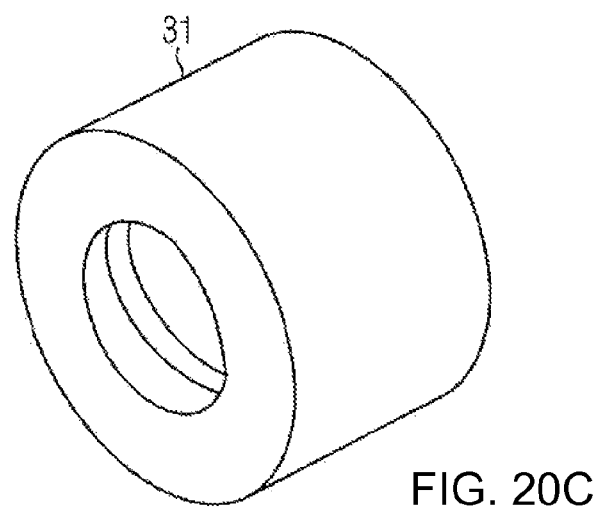
FIG. 20C shows the sleeve in a perspective representation.

The embodiment shown in FIGS. 19A and 19B also has a filling tube 3, this embodiment corresponding to the other embodiments, while here the brake ring 1 is formed at the filling tube end of the filling tube 3, e.g., by injection. The brake ring is formed, for example, from an elastomer. In this embodiment, the brake ring 1 may expand conically. In the region above the brake ring 1, a sleeve 31 is concentrically formed. The inner wall of the sleeve 31 may either be hollow-cylindrical or, as shown in FIG. 19B, taper in the direction of transport T. As was already described above, the sleeve 31 may comprise here an indentation 23 (e.g., recess or groove) which may spirally or helically wind around the longitudinal axis L of the filling tube 3. As was also described in connection with the previous embodiments, the sleeve 31 may also comprise a corresponding elevation 22, as is represented in FIGS. 20A and 20B, which also winds at the inner surface of the sleeve 31 around the longitudinal axis L. Thus, here, too, the advantages mentioned in connection with the previous embodiments result. The sleeve 31 may be made, for example, of metal. However, the sleeve may also be made of an elastomer, where the filling tube end may then be metallic. The sausage casing will then extend between the brake ring 1 and the sleeve 31. The adjustment of the brake force is effected by axially shifting the sleeve 31.

Figure 13:
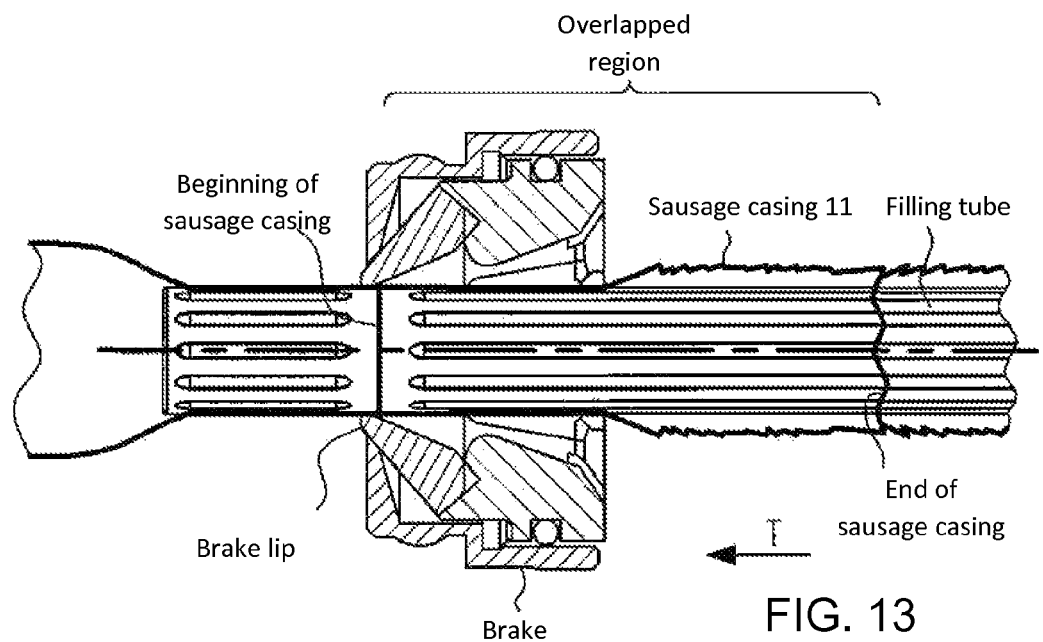
FIG. 13 schematically shows a section through a sausage casing brake.
Figure 14:
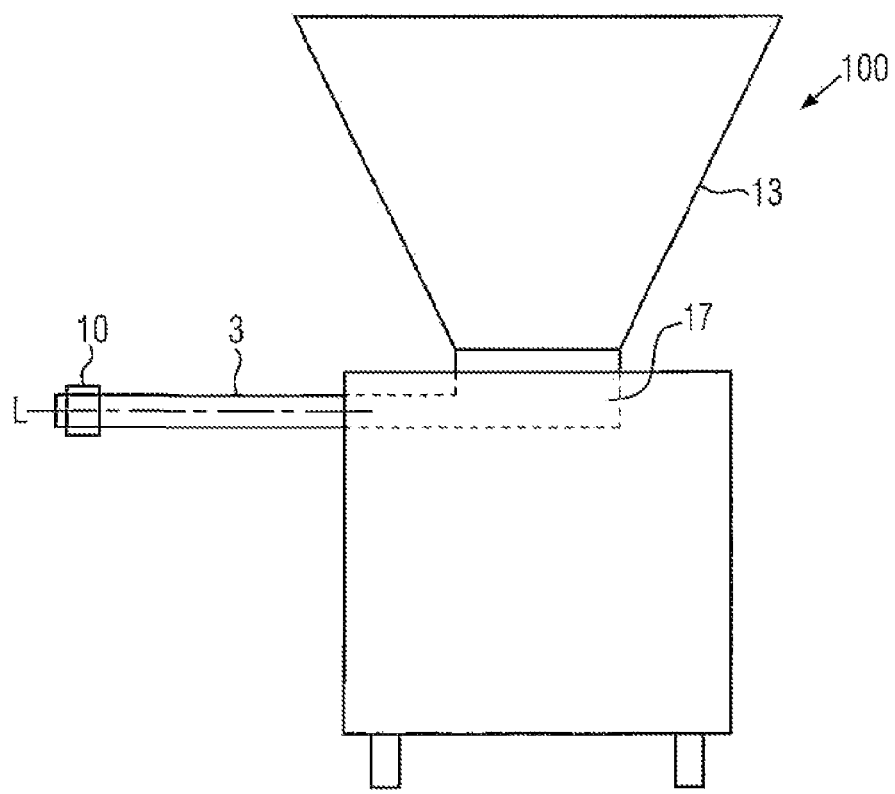
FIG. 14 schematically shows a filling machine with a sausage casing brake.

In the method according to the disclosure, in particular in the operating method, first the sausage casing 11 is placed onto the filling tube 3 over its free end 3a, and then the sausage casing brake 10 (FIG. 3) is positioned on the filling tube. In the method according to the present disclosure, an overlapped sausage skin, as shown in FIG. 13, is used as a sausage casing, however, other, not overlapped sausage casings may also be processed. During filling, the sausage casing is filled with (e.g., pasty) mass through the filling tube 3, the mass being ejected via a feed mechanism 17 (FIG. 14) portion by portion or continuously. While the sausage casing 11 is being filled, it is drawn off the filling tube 3. In the process, the sausage casing 11 is pressed onto the filling tube 3 by the brake ring 1 of the sausage casing brake 10 and thus is somewhat slowed down, so that the speed at which the sausage casing is drawn off the filling tube is somewhat smaller than or equal to the ejection speed of the mass. According to the present disclosure, the braking area of the brake ring 1 is designed such that it extends around the filling tube 3 such that the braking area 2 (FIG. 2B) lies against a part, and not the entirety, of the circumference of the filling tube 3 in a plane perpendicular to the longitudinal axis of the filling tube L, as can in particular be seen in FIGS. 1, 2B and 11B. Thus, the brake force may be distributed along the longitudinal axis L, whereby the natural casing may be treated with care. In the respective free region 12 (FIG. 2B) in which the braking area does not lie against the sausage casing or the casing, the sausage casing may be further drawn off without hindrance. Thus, overlapped points of two subsequent casing pieces of a sausage skin may be drawn off without hindrance and without pulling apart the casing parts. Further, air inclusions and not sufficiently filled products may be effectively prevented as a sufficient braking effect can be realized altogether because the brake ring also has an extension in the direction of the longitudinal axis of the filling tube.

If, for example, a sufficient amount has been ejected, for creating a wring-off point, the filling tube may be caused to rotate together with the sausage casing brake. In the process, the sausage casing brake 10 may either be driven together with the filling tube, or it may have its own drive. In some implementations, the sausage casing brake 10 has a separate drive. A superimposition of the functions "eject sausage meat" and "wring off sausage casing" is also possible.

If the speed of the filling tube differs from the speed of the sausage casing brake, due to the arrangement of the braking area 2 asymmetrically to the longitudinal axis of the filling tube L, in particular with a spiral brake ring and spiral elevations or indentations, other friction conditions arise which promote the slipping through of the overlapped point. The speeds, however, may also be set to be identical.

It will be appreciated that the configurations and routines disclosed herein are exemplary in nature, and that these specific embodiments are not to be considered in a limiting sense, because numerous variations are possible. For example, variation in the implementations described herein, including but not limited to variations in geometry, dimensioning, relative positioning, quantity, etc., are possible without departing from the scope of this disclosure. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for manufacturing sausages with a filling machine, comprising:
    ejecting a mass through a filling tube into a sausage casing ruffled on the filling tube;
    exerting a brake force on the sausage casing via a sausage casing brake on a braking area of a brake ring pressing onto the sausage casing,
        wherein the braking area extends around a longitudinal axis of the filling tube such that the braking area presses onto a part, and not the entirety, of a circumference of the sausage casing in a plane perpendicular to the longitudinal axis, and
        wherein the brake force is distributed in a direction along the longitudinal axis; and
    rotating the sausage casing brake to create a wring-off point, a speed of the sausage casing brake being one of different from or equal to a speed of the filling tube, or variable.

2. The method of claim 1, wherein the braking area winds in a direction along the longitudinal axis at least around a part of the circumference of the filling tube such that there is a plane which contains the longitudinal axis and in which the braking area lies against points staggered with respect to each other in a longitudinal direction at opposed sides of the longitudinal axis.

3. The method of claim 1, wherein the brake ring overlaps a circumferential area of the filling tube by between 300° to 720°.

4. The method of claim 1, wherein the brake ring is formed of an elastic material.

5. A method for manufacturing sausages with a filling machine, comprising:
    ejecting a mass through a filling tube into a sausage casing ruffled on the filling tube; and
    exerting a brake force on the sausage casing via a sausage casing brake on a braking area of a brake ring pressing onto the sausage casing,
        wherein the braking area extends around a longitudinal axis of the filling tube such that the braking area presses onto a part, and not the entirety, of a circumference of the sausage casing in a plane perpendicular to the longitudinal axis,
        wherein the brake force is distributed in a direction along the longitudinal axis, and
        wherein the braking area extends asymmetrically to the longitudinal axis.

6. A method for manufacturing sausages with a filling machine, comprising:
    ejecting a mass through a filling tube into a sausage casing ruffled on the filling tube; and
    exerting a brake force on the sausage casing via a sausage casing brake on a braking area of a brake ring pressing onto the sausage casing,
        wherein the braking area extends around a longitudinal axis of the filling tube such that the braking area presses onto a part, and not the entirety, of a circumference of the sausage casing in a plane perpendicular to the longitudinal axis,
        wherein the brake force is distributed in a direction along the longitudinal axis, and
        wherein the braking area winds spirally around the filling tube.

7. The method of claim 6, wherein a lead of the spiral winding is within one of a first range and a second range, the first range being from greater than zero millimeters to thirty millimeters, the second range being from five millimeters to fifteen millimeters.

8. A method for manufacturing sausages with a filling machine, comprising:
    ejecting a mass through a filling tube into a sausage casing ruffled on the filling tube; and
    exerting a brake force on the sausage casing via a sausage casing brake on a braking area of a brake ring pressing onto the sausage casing,
        wherein the braking area extends around a longitudinal axis of the filling tube such that the braking area presses onto a part, and not the entirety, of a circumference of the sausage casing in a plane perpendicular to the longitudinal axis,
wherein the brake force is distributed in a direction along the longitudinal axis, and
wherein the brake ring is a multi-piece brake ring comprising at least two spiral sections.

9. A sausage casing brake for a filling machine, comprising:
a brake ring pressing onto a sausage casing,
wherein the sausage casing brake is configured to exert a brake force on the sausage casing on a braking area of the brake ring,
wherein the braking area extends around a longitudinal axis of a filling tube such that in a plane perpendicular to the longitudinal axis, the braking area presses onto a part of a circumference of the sausage casing, the brake force being distributed in a direction along the longitudinal axis, and
wherein the braking area extends asymmetrically to the longitudinal axis.

10. The sausage casing brake of claim 9,
wherein the brake ring is arranged such that the brake ring extends around the filling tube such that the braking area presses onto a filling tube surface.

11. The sausage casing brake of claim 9, further comprising a drive via which the brake ring is rotated.

12. The sausage casing of brake claim 11, wherein the brake ring is rotated via the drive at variable speeds.

13. The sausage casing brake of claim 9,
wherein the brake ring is formed at a filling tube end, and
wherein the braking area presses against a surface arranged around the brake ring.

14. The sausage casing brake of claim 13, wherein the surface is a sleeve.

15. A sausage casing brake for a filling machine, comprising:
a brake ring pressing onto a sausage casing,
wherein the sausage casing brake is configured to exert a brake force on the sausage casing on a braking area of the brake ring,
wherein the braking area extends around a longitudinal axis of a filling tube such that in a plane perpendicular to the longitudinal axis, the braking area presses onto a part of a circumference of the sausage casing, the brake force being distributed in a direction along the longitudinal axis,
a brake ring retainer asymmetrical to the longitudinal axis; and
a tensioning device configured to exert a variable force on the brake ring such that the brake force is adjustable, the tensioning device comprising two tensioning means between which the brake ring is arranged, the tensioning means each being non-symmetrical to the longitudinal axis.

16. A sausage casing brake for a filling machine, comprising:
a brake ring pressing onto a sausage casing,
wherein the sausage casing brake is configured to exert a brake force on the sausage casing on a braking area of the brake ring,
wherein the braking area extends around a longitudinal axis of a filling tube such that in a plane perpendicular to the longitudinal axis, the braking area presses onto a part of a circumference of the sausage casing, the brake force being distributed in a direction along the longitudinal axis,
wherein the brake ring is closed, and
wherein a plane in which the braking area lays is inclined by between 10° and 45° with respect to the plane which is perpendicular to the longitudinal axis.

17. A sausage casing brake for a filling machine, comprising:
a brake ring pressing onto a sausage casing,
wherein the sausage casing brake is configured to exert a brake force on the sausage casing on a braking area of the brake ring,
wherein the braking area extends around a longitudinal axis of a filling tube such that in a plane perpendicular to the longitudinal axis, the braking area presses onto a part of a circumference of the sausage casing, the brake force being distributed in a direction along the longitudinal axis,
wherein the brake ring is formed at a filling tube end,
wherein the braking area presses against a surface arranged around the brake ring, and
wherein the brake ring comprises one of an elevation winding around the longitudinal axis and an indentation winding around the longitudinal axis.

18. A sausage casing brake for a filling machine, comprising:
a brake ring pressing onto a sausage casing,
wherein the sausage casing brake is configured to exert a brake force on the sausage casing on a braking area of the brake ring,
wherein the braking area extends around a longitudinal axis of a filling tube such that in a plane perpendicular to the longitudinal axis, the braking area presses onto a part of a circumference of the sausage casing, the brake force being distributed in a direction along the longitudinal axis,
wherein the brake ring is formed at a filling tube end,
wherein the braking area presses against a surface arranged around the brake ring, and
wherein the surface comprises one of an elevation winding around the longitudinal axis and an indentation winding around the longitudinal axis.

19. A filling machine for filling a sausage casing with mass with a filling tube, comprising:
a sausage casing brake; and
a brake ring,
wherein a braking area extends around a longitudinal axis of the filling tube such that in a plane perpendicular to the longitudinal axis of the filling tube, the braking area presses onto a part of a circumference of the sausage casing, and
wherein the brake ring winds around the longitudinal axis.

20. The filling machine of claim 19, wherein a surface of the filling tube comprises one of an elevation and an indentation which winds around the longitudinal axis.

21. The filling machine of claim 19, wherein a surface of the brake ring comprises one of an elevation and an indentation which winds around the longitudinal axis.

22. The filling machine of claim 19, wherein the brake ring is a sleeve at an inner surface of which one of an elevation and an indentation is formed which winds around the longitudinal axis.

23. A filling machine for filling a sausage casing with mass with a filling tube, comprising:
a sausage casing brake; and
a brake ring,
wherein a braking area extends around a longitudinal axis of the filling tube such that in a plane perpendicular to the longitudinal axis of the filling tube, the braking area presses onto a part of a circumference of the sausage casing, and wherein at least one free section is formed in the plane through which the sausage casing is passed without being slowed down, and wherein the at least one free section extends in the plane over at least 20° of a circumference of the filling tube.

* * * * *